United States Patent [19]
Yamashita et al.

[11] Patent Number: 5,537,266
[45] Date of Patent: Jul. 16, 1996

[54] TAPE LOADING DEVICE AND MAGNETIC CONVERSION APPARATUS

[75] Inventors: Taichiro Yamashita, Tsuchiura; Kazuo Sakai; Yasuhiro Nemoto, both of Ibaraki-ken; Shigeyuki Kobata, Odawara; Masao Iwakura, Odawara; Masatoshi Ishikawa, Odawara, all of Japan

[73] Assignee: Hitachi, Ltd., Tokyo, Japan

[21] Appl. No.: 309,410

[22] Filed: Sep. 20, 1994

[30] Foreign Application Priority Data

Sep. 20, 1993 [JP] Japan ..................................... 5-232794

[51] Int. Cl.⁶ .............................................. G11B 15/665
[52] U.S. Cl. ................................................ 360/85; 360/95
[58] Field of Search ..................................... 360/84–85, 95

[56] References Cited

U.S. PATENT DOCUMENTS 5,321,565  6/1994  Shibaike et al. ......................... 360/85
5,321,567  6/1994  Kano et al. ............................... 360/85
5,365,386  11/1994 Konishi et al. ....................... 360/95 X
5,369,536  11/1994 Konishi et al. ........................... 360/85

FOREIGN PATENT DOCUMENTS 60-5454   1/1985  Japan .
1-10455   1/1989  Japan .
4-114348  4/1992  Japan .

Primary Examiner—John H. Wolff
Attorney, Agent, or Firm—Antonelli, Terry, Stout & Kraus

[57] ABSTRACT

In a tape loading device of the invention, a tape is taken out by tape guides mounted on an inclined loading ring, and the loading ring is rotated to wind the tape on a rotary drum from one side thereof. An auxiliary inclined guide is provided between the rotary drum and the leading tape guide. Only during a loading operation, the auxiliary inclined guide contacts the tape, while angularly moved about the leading tape guide. When the loading operation is completed, the auxiliary inclined guide is disengaged from the tape. With the provision of the auxiliary inclined guide, the tape is prevented from being twisted between the rotary drum and the leading tape guide.

22 Claims, 18 Drawing Sheets

TAPE LOADING DEVICE AND MAGNETIC CONVERSION APPARATUS

BACKGROUND OF THE INVENTION

1. Field of the Invention

This invention relates to a tape loading device for use in a rotary head-type magnetic conversion apparatus (e.g. VTR), in which a tape-like recording medium (hereinafter referred to as "tape") is taken out from a tape reel, and is wound on a rotary drum having magnetic heads mounted thereon, and magnetic information is recorded on and/or reproduced from the tape by the magnetic heads, and the tape wound on the rotary drum is taken up by another reel. The invention relates more particularly to a tape loading device for use in a helical scan-type magnetic conversion apparatus in which the tape is wound on the rotary drum in an inclined manner.

2. Description of Related Art

A video tape recorder including a rotary drum with magnetic heads mounted thereon, and a tape cassette containing two tape reels (i.e., a supply reel and a take-up reel), or a recording/reproducing unit of the helical scan type for use with a tape cartridge containing a single tape reel, need to be provided with a tape loading device by which a tape is taken out from the tape cassette or the tape cartridge and is wound on the rotary drum over a predetermined angle.

There is known one such tape loading device for such units, in which a tape is taken out by a tape guide movable in an inclined plane and is wound on a rotary drum from one side thereof.

For example, there is known a tape loading device of the type in which an inclined, disk-like loading ring, having a plurality of tape guides mounted thereon, is angularly movably disposed around a rotary drum, and the loading ring is angularly moved to cause the tape to be taken out and wound on the rotary drum by the tape guides. In such a tape loading device, either a tape travel path from a supply tape reel to the rotary drum or a tape travel path from the rotary drum to a take-up tape reel is in the same horizontal plane as the tape reels, so that the height and the inclination will not be varied. In the other tape travel path, the tape, helically or spirally wound on the rotary drum and then disengaged therefrom, is inclined, and therefore this travel path has two tape travel planes, that is, the inclined tape travel plane parallel to the loading ring, and the horizontal tape travel plane which is the same as that of the tape reel. The tape is wound on an inclined post provided at the boundary between the two tape travel planes, thereby changing the tape travel plane without twisting the tape. In the case of such a tape loading device having a loading ring, in order to avoid interference of the loading ring with the tape travel path, the tape is wound on the rotary drum downwardly from the horizontal plane. Therefore, the plane of inclination of the loading ring is also downward from the horizontal plane.

In the above tape loading device, by a tape take-out means movable in a horizontal plane, the tape is first taken out from the tape cassette or the tape cartridge in the same plane as that of the tape reels to thereby form a predetermined semi-loaded condition. Then, by rotating the loading ring, the tape is engaged by the leading tape guide on the loading ring, and the tape is spirally wound on the rotary drum over a predetermined angle, for example, from the take-up tape reel side. Thus, the tape is taken out by the tape guide moving in the inclined plane in which the loading ring is mounted, and is wound on the rotary drum from one side thereof. This type is called a U-loading system because of the configuration of the tape travel system in its loading-completed condition.

In such a tape loading device, the loading ring, as well as the tape guides on the loading ring, is designed in accordance with the inclination of the tape travel plane in the loading-completed condition. Therefore, during the loading operation, the tape is liable to be twisted, so that the tape may be damaged. For example, the upper and lower edges of the tape are expanded and corrugated because of the difference in tension between the upper and lower tape edges.

To prevent such damage, there is proposed in Japanese Patent Unexamined Publication No. 64-10455 a tape loading device having a mechanism by which an inclined post is rotated about a predetermined point in accordance with angular movement of a loading ring so that the angle of winding of a tape on the inclined post can always be kept to the angle of winding on the inclined post in a loading-completed condition.

There is also proposed in Japanese Patent Unexamined Publication Nos. 60-5454 and 4-114348 a construction having a mechanism by which the inclination of a leading tape guide on a loading ring is changed to a vertical disposition only when the leading tape guide begins to contact a tape.

Twisting of the tape, which is a problem with the prior art techniques, is caused by two factors, that is, (1) the angle of winding of the tape on the inclined post for changing the tape travel path from the horizontal tape reel plane to the surface of the tape guide on the inclined loading ring is varied during the loading operation, and (2) the tape is twisted between the leading tape guide on the loading ring and the rotary drum because the angle of winding of the tape on the rotary drum is varied during the loading operation.

The tape loading device disclosed in the above Japanese Patent Unexamined Publication No. 64-10455 can overcome the tape twisting factor (1), but can not overcome the factor (2) by which the tape is twisted between the rotary drum and the leading tape guide, so that the tape damage caused by caused by the leading tape guide during the loading operation can not be effectively prevented.

Moreover, when the loading operation begins, the tape, disposed in the horizontal tape reel plane in a semi-loaded condition, is taken out by the leading tape guide on the inclined loading ring. However, since the leading tape guide is mounted on the inclined flat surface slanting downwardly, the leading tape guide is disposed at a level or height lower than the tape, and is kept inclined at a position where the leading tape guide begins to contact the tape. In this condition, each time the loading operation is effected, a flange formed at an upper end of the leading tape guide engages the surface of the tape, and this causes tape damage.

In this respect, the above Japanese Patent Unexamined Publication Nos. 60-5454 and 4-114348 disclose constructions in which the tape can be kept in a proper posture at the position where the leading tape guide begins to contact the tape and also when the loading operation is completed, but there has been encountered a problem that the tape can not be kept in a sufficiently proper posture during the loading operation.

SUMMARY OF THE INVENTION

It is an object of this invention to provide a tape loading device of a so-called U-loading system in which that portion of a tape (e.g. a magnetic tape) extending between a take-out guide on a loading ring and a rotary drum is prevented from being twisted during a loading or an unloading operation, thereby preventing damage to the tape during the loading or unloading operation, thus enabling the use of a thin tape, and also to provide a magnetic conversion apparatus using such a tape loading device.

To achieve the above objects, according to one aspect of the invention,i there is provided a tape loading device comprising:

fixing means for fixing a tape reel having a tape wound thereon;

a rotary drum for spirally winding the tape on an outer periphery thereof over a predetermined angle, the rotary drum having at least one magnetic head mounted thereon;

a plurality of tape guides supported for movement in a plane inclined relative to the tape reel;

moving means for moving the plurality of tape guides around the rotary drum along a predetermined path on the inclined plane so that a loading operation is effected in a manner that the plurality of tape guides are moved along the predetermined path and a leading one of the plurality of tape guides takes out the tape from the tape reel to spirally wind the recording medium on the rotary drum over the predetermined angle, and an unloading operation is effected in a manner that the plurality of tape guides are moved along the predetermined path in a direction reverse to the direction of movement of the plurality of tape guides during the loading operation; and an auxiliary guide inclined relative to the leading tape guide so that the auxiliary guide comes in contact with a portion of the tape extending between the rotary drum and the leading tape guide during the loading or the unloading operation.

Preferred forms of the auxiliary inclined guide are as follows.

The auxiliary inclined guide may be inclined in such a direction that a portion of the tape extending between the leading tape guide and the auxiliary inclined guide is kept in a flat plane.

The auxiliary inclined guide may be inclined in a direction different from such a direction that the portion of the tape extending between the leading tape guide and the auxiliary inclined guide is kept in a flat plane.

The auxiliary inclined guide may be so arranged as to angularly move in proximity to the leading tape guide mounted in a generally upstanding manner on a support member which is angularly moved around the rotary drum by the moving means.

The auxiliary inclined guide may be mounted in a generally upstanding manner on a holder member mounted for angular movement about an axis of the leading tape guide, and in accordance with the movement of the leading tape guide, the holder member is angularly moved about the axis of the leading tape guide.

In accordance with the angular movement of the support member, the auxiliary inclined guide may be angularly moved about the leading tape guide by means of a guide groove which changes along a path of movement of the leading tape guide, mounted on the support member, in a direction generally perpendicular to a longitudinal direction of the movement path within the range of the distance between the leading tape guide and the auxiliary inclined guide.

The auxiliary inclined guide may be tiltably supported in a plane inclined relative to the inclined plane in which the tape guides are movable, and in accordance with the movement of the tape guides, the angle of inclination of the auxiliary inclined guide is varied in the inclined surface.

The auxiliary inclined guide may be supported for movement parallel to the inclined plane in which the tape guides are movable, and in accordance with the movement of the tape guides, the auxiliary inclined guide moves along the inclined plane.

According to another aspect of the invention, there is provided a tape loading device comprising:

fixing means for fixing a tape reel having a tape wound thereon;

a rotary drum for spirally winding the tape on an outer periphery thereof over a predetermined angle, the rotary drum having at least one magnetic head mounted thereon;

a plurality of tape guides supported for movement in a plane inclined relative to the tape reel;

moving means for moving the plurality of tape guides around the rotary drum along a predetermined path on the inclined plane so that a loading operation is effected in a manner that the plurality of tape guides are moved along the predetermined path and a leading one of the plurality of tape guides takes out the tape from the tape reel to spirally wind the recording medium on the rotary drum over the predetermined angle, and an unloading operation is effected in a manner that the plurality of tape guides are moved along the predetermined path in a direction reverse to the direction of movement of the plurality of tape guides during the loading operation; and during the loading or the unloading operation, the leading tape guide being moved while changing its three-dimensional position relative to the inclined plane.

In this device, the leading tape guide may be moved while varying its position in a three-dimensional manner, following a guide groove provided along the predetermined path along which the leading tape guide moves in the inclined plane.

According to another aspect of the invention, there is provided a magnetic conversion apparatus comprising:

tape cassette fixing means for fixing a tape cassette containing a supply tape reel and a take-up tape reel, a tape being wound around the supply and take-up tape reels;

tape reel drive means for driving the tape reels;

a rotary drum having a magnetic converter mounted thereon, by which information can be written on and read from the tape spirally wound on an outer periphery of the rotary drum over a predetermined angle;

signal processing means for processing signals to enable the magnetic converter to magnetically convert the information;

control means responsive to signals from the signal processing means for controlling the magnetic converter and the tape reel drive means in the unit to effect the magnetic conversion of the information; and a tape loading device for loading the tape, fixed at a cassette fixing portion, on the rotary drum, the tape loading device being, one of the above-mentioned tape loading devices.

According to a further aspect of the invention, there is provided a magnetic conversion apparatus comprising:

tape cartridge fixing means for fixing a tape cartridge containing a supply tape reel having a tape wound thereon;

a take-up tape reel for winding the tape thereon;

tape reel drive means for driving the tape reels;

a threading mechanism for moving a tape take-out member, fixedly secured to one end of the tape wound on the supply tape reel contained in the tape cartridge, to the take-up tape reel;

a rotary drum having a magnetic converter mounted thereon, by which information can be magnetically converted relative to the tape spirally wound on an outer periphery of the rotary drum over a predetermined angle;

signal processing means for processing signals to enable the magnetic converter to write and read the information;

control means responsive to signals from the signal processing means for controlling the magnetic converter and the tape reel drive means in the unit to effect the magnetic conversion of the information; and a tape loading device for loading the tape, guided by the threading mechanism, on the rotary drum, the tape loading device being one of the above-mentioned tape loading devices.

The magnetic converter provided in the above magnetic conversion apparatus may be a read head, a write head, or a read/write head.

In the tape loading devices of the invention and the magnetic conversion apparatus including any one of these tape loading-devices, the auxiliary inclined guide is contacted with the portion of the tape, extending between the rotary drum and the tape guide, over a suitable angle in accordance with the angular movement of the loading ring during the tape loading or the tape unloading operation. By doing so, the tape is prevented from being twisted.

Since the rotary drum and the leading tape guide are different from each other in the inclination angle and the inclination direction, the length of one lateral edge of the portion of the tape lying between the rotary drum and the leading tape guide is different from the length of the other lateral edge. Therefore, tensions exerted respectively on the opposite lateral edges of the tape are different from each other, so that the tape may be damaged.

In the above-mentioned tape loading devices, the above-mentioned various forms of the auxiliary inclined guide serve to prevent a twist from developing on the tape between the rotary drum and the leading tape guide, thereby preventing damage to the tape.

DESCRIPTION OF THE PREFERRED EMBODIMENTS

A first embodiment of a tape loading device of the present invention will now be described with reference to FIGS. 1 to 15.

Figure 1:
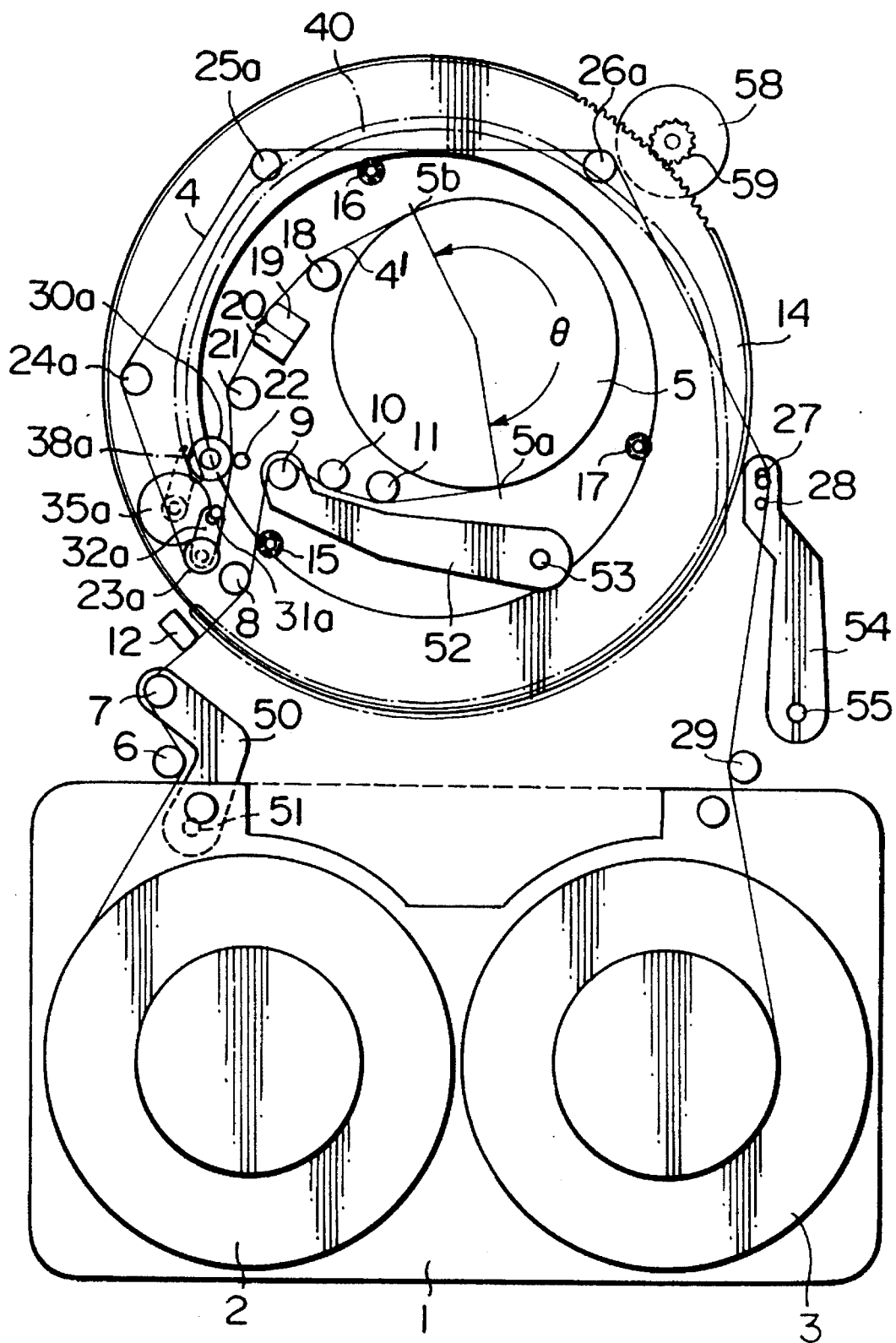
FIG. 1 is a plan view showing the construction of a tape loading device of the invention.
Figure 2:
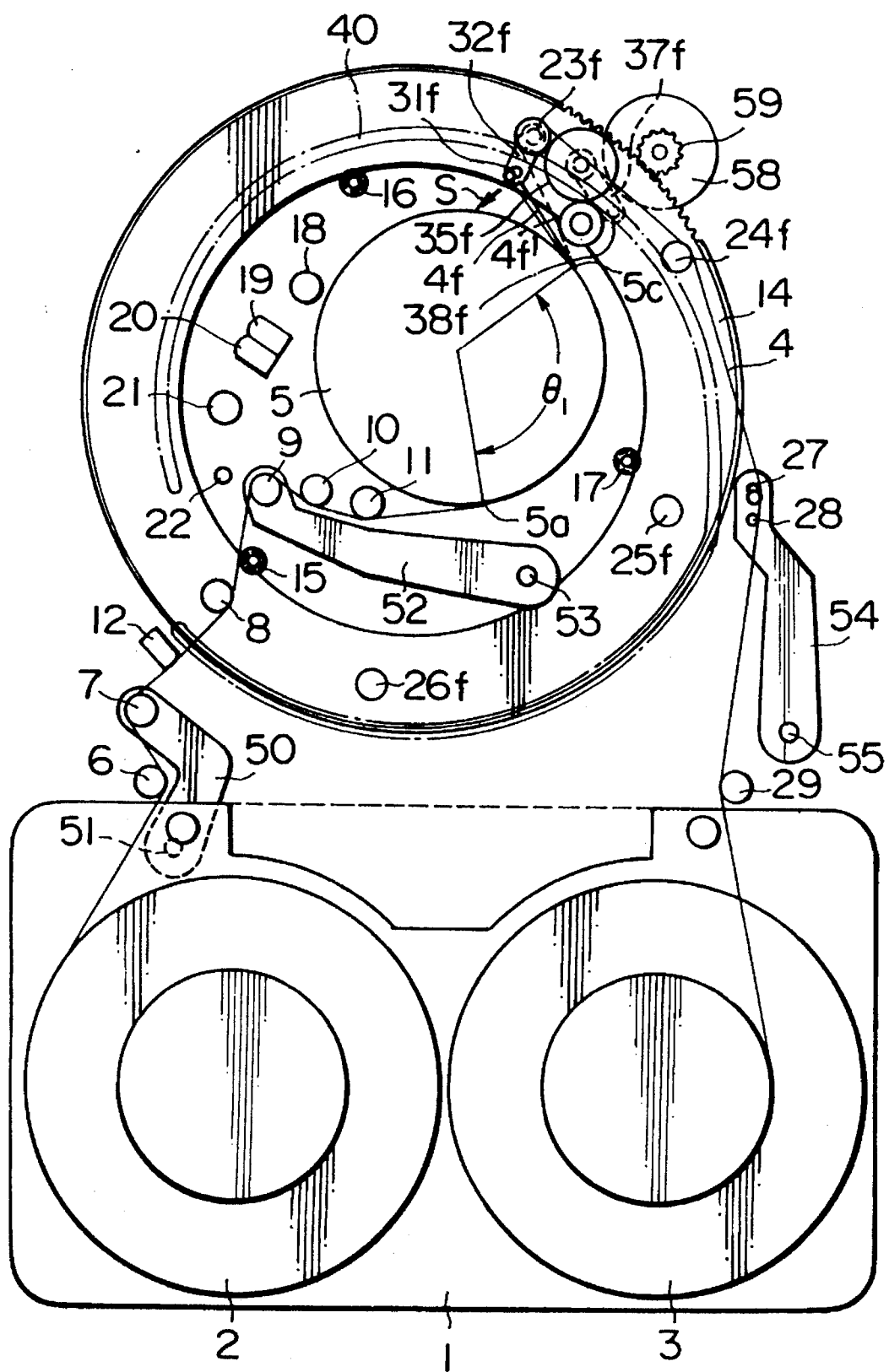
FIG. 2 is a view similar to FIG. 1, showing a different operating condition.

FIGS. 1 and 2 are plan views showing the construction of the first embodiment of the tape loading device of the invention. More specifically, FIG. 1 is a plan view showing a condition in which a tape loading operation is completed, and a tape is wound on a rotary drum over a predetermined angle. FIG. 2 is a plan view showing a condition during the loading operation. In FIGS. 1 and 2, although part of a tape travel path, the rotary drum, a loading ring, tape guides mounted on the loading ring, and so on are actually inclined, these parts are depicted as standing upright on a common plane to avoid the complication of the illustration.

In FIG. 1, a removable tape cassette 1 contains a supply tape reel 2 and a take-up tape reel 3 therein, and a tape 4 is wound on these tape reels 2 and 3. The tape cassette 1 with the tape reels 2 and 3 is held in a predetermined position by fixing means (not shown). The tape 4 is spirally wound over a predetermined angle on the periphery of the rotary drum 5 with a predetermined lead angle. For example, if the tape 4 is a magnetic recording tape, a rotary-type read/write magnetic head is mounted on the rotary drum 5, and the rotary drum can be held in contact with the magnetic recording tape to record or reproduce magnetic signals.

The tape 4, supplied from the supply reel 2, passes past tape guides 6 and 7, an erase head 12, tape guides 8, 9, 10 and 11 which are disposed on the same horizontal plane as that of the supply reel 2, and reaches (that is, is incident on) the rotary drum 5 at a point 5a. The tape guide 7 is mounted on a first take-out arm 50, and can angularly move about an axis 51 of pivotal movement. The tape guide 9 is mounted on a second take-out arm 52 which can angularly move about an axis 53 of pivotal movement. Since the tape guides 6, 7, 8, 9, 10 and 11 and the erase head 12 are disposed on the same horizontal plane as that of the supply reel 2, the tape 4 will not be twisted and varied in height in a tape travel path from the supply reel 2 to the tape incident point 5a of the rotary drum 5.

It is necessary for the tape 4 to properly contact the surface of the rotary drum 5 without being twisted at the tape incident point 5a on the rotary drum 5. This requirement can be met by inclining the rotary drum 5 by an angle, corresponding to the lead angle, in a direction of incidence of the tape 4 at the tape incident point 5a.

A tape guide 18 is provided in accordance with an inclination angle and a direction angle of the tape 4' disengaged from the rotary drum 5 at a tape disengaging point 5b after the tape 4 is wound over a predetermined angle θ on the rotary drum 5. Fixed heads 19 and 20 for inputting and outputting control signals relative to the tape, a tape guide 21, and a capstan 22 for imparting a conveying force to the tape to convey the tape are also inclined with the same inclination angle and direction angle as those of the tape guide 18.

A loading ring 14 has a gear formed on its outer periphery and is rotatably supported by ring support rollers 15, 16 and 17, and is inclined with the same inclination angle and direction angle as those of the tape guide 18. The loading ring 14 is supplied with a rotational force from a motor 58 via a pinion 59 in mesh with the gear formed at the outer periphery of the loading ring 14, and is rotated.

Next, reference is now made to tape guides mounted on the loading ring 14 in an upstanding manner. In the loading-completed condition shown in FIG. 1, suffix a is added.

Reference numeral 23a denotes a leading tape guide, and this leading tape guide takes out the tape 4 earliest among the tape guides mounted on the loading ring 14. Tape guides 24a, 25a and 26a are mounted on the loading ring 14 in an upstanding manner. Like the loading ring 14, the leading tape guide 23a and the tape guides 24a, 25a and 26a are inclined with the same inclination angle and direction angle as those of the tape guide 18. A pinch roller 30a is urged against the capstan 22 to hold the tape 4 therebetween.

The tape 4 is suitably wound around an inclined post 27, so that the path of travel of the tape 4 extends around the tape guides 23a, 24a, 25a and 26a. That is, the tape 4 traveling in an inclined manner in accordance with the inclination angle and direction angle of the tape 4' disengaged from the rotary drum 5 at the tape disengaging point 5b, can be changed to the same horizontal plane as that of the take-up tape reel 3. Tape guides 28 and 29 are mounted in the same plane as that of the take-up tape reel 3 and guide the tape 4 to the take-up tape reel 3. The inclined post 27 and the tape guide 28 are mounted on a third take-out arm 54, and can angularly move about an axis 55 of pivotal movement. A support link 32a is supported for rotation about an axis disposed coaxially with the tape guide 23a, and an auxiliary inclined guide 31a is mounted on one end portion of the support link 32a in an upstanding manner, and is inclined with respect to the tape guide 23a.

A guide groove 40 serves to rotate the support link 32 and the auxiliary inclined guide 31 in accordance with the angular movement of the loading ring 14.

FIG. 2 is a plan view showing a condition during the loading operation in which the loading ring 14 is angularly moved an angle of 150° in a clockwise direction from the loading-completed condition (FIG. 1) serving as a reference. In this condition, suffix f is used. In accordance with the angular movement of the loading ring 14, the leading tape guide 23f and the tape guides 24f, 25f and 26f are angularly moved from their respective positions of FIG. 1, so that the angle of winding of the tape 4 on the rotary drum 5 is θ1. The tape 4 has not yet been extended around the tape guides 25f and 26f. The guide groove 40 is generally spiral with respect to the loading ring 14, and the support link 32f and the auxiliary inclined guide 31f, mounted on the support link 32f, are angularly moved in accordance with the angular movement of the loading ring 14. The effect, achieved by winding the tape 4 on the auxiliary inclined guide 31f during the loading operation, will now be described.

As described above with reference to FIG. 1, the inclination angle and direction angle of the loading ring 14, the leading tape guide 23 and the tape guides 24, 25 and 26 (which are mounted on the loading ring 14) coincide with the inclination angle and direction angle of the tape 4 at the tape disengaging point 5b where the tape 4 disengages from the rotary drum 5 when the tape 4 is wound on the rotary drum 5 over the predetermined angle θ. Even if the loading ring 14 is rotated in any manner, this inclination angle and direction angle are not varied during the loading operation, and therefore are always constant throughout the sequential loading operations, including the case where the loading ring 14 is rotated through 150° as shown in FIG. 2. On the other hand, the angle of winding of the tape 4 on the rotary drum is θ1, and is smaller than the angle θ. Since the tape 4 is spirally wound on the rotary drum 5 with a predetermined lead angle, the inclination angle and direction angle of the tape 4 at a tape disengaging point 5c corresponding to the winding angle θ1 are different from those obtained in the loading-completed condition. The height of travel of the tape 4 on the leading tape guide 23f is limited by flanges formed on this leading tape guide 23f. Therefore, if the tape 4 is extended directly from the rotary drum 5 to the leading tape guide 23f, the inclination angle and direction angle of the tape 4f' at the rotary drum (5) side are different from those at the leading tape guide (23f) side, so that the length of the upper edge of the tape between the rotary drum 5 and the leading tape guide 23f is not equal to the length of the lower edge of the tape. As a result, for example, only the lower edge of the tape 4f' is very tense whereas the upper edge of the tape is loose. If the tape 4 is taken out in this condition, the tense lower edge of the tape is strongly pressed against the flange whereas the upper edge of the tape is in loose contact with the flange, and therefore is liable to buckling, and the edge of the tape 4 is liable to be damaged. This is a great obstacle to a thin design of the tape 4 enabling a long-recording. During the loading operation, it is desirable that the tape 4 be always wound uniformly around the leading tape guide 23f without any twist.

The auxiliary inclined guide 31f, provided between the tape disengaging point 5c on the rotary drum 5 and the leading tape guide 23f, will now be described. The auxiliary inclined guide 31f is inclined with respect to the leading tape guide 23f generally in a direction of arrow S. Here, the tape 4 is extended as at 4f. If the inclination of the auxiliary inclined guide 31f and the winding angle of the tape 4 are suitably determined, the tape 4 is wound around the auxiliary inclined guide 31f between the rotary drum 5 and the leading tape guide 23f, so that the length of the lower edge of the tape 4 can be made equal to the length of the upper edge of the tape 4. As a result, the undue tension of the lower tape edge, which would be produced without the auxiliary inclined guide 23f, is canceled, thereby meeting a requirement for the uniform winding of the tape 4 around the leading tape guide 23f. If this requirement is satisfied throughout the loading operation, an undue force will not be exerted on the tape 4, and therefore there can be provided the tape loading device which prevents damage to the tape 4, and hence is highly reliable.

Figure 3:
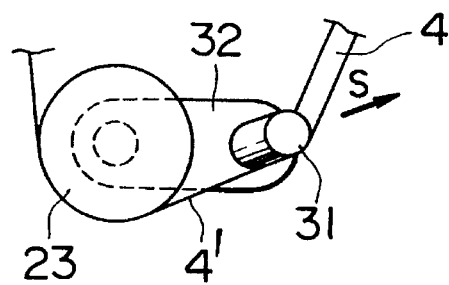
FIG. 3 is a fragmentary plan view showing an inclined posture of an auxiliary inclined guide.
Figure 4:
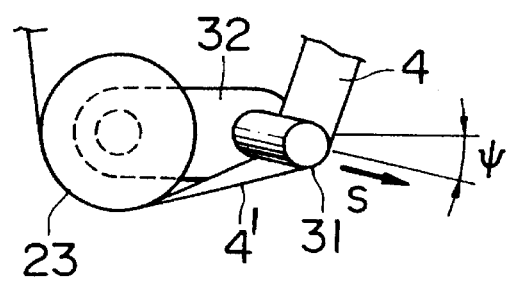
FIG. 4 is a fragmentary plan view showing another inclined posture of the auxiliary inclined guide.

The inclination of the auxiliary inclined guide 31 will now be described with reference to FIGS. 3 and 4. FIGS. 3 and 4 are fragmentary plan views showing the leading tape guide 23 and the auxiliary inclined guide 31, as viewed in a direction of the axis of the leading tape guide 23. In FIGS. 3 and 4, arrow S indicates the direction of inclination of the auxiliary inclined guide 31. In FIG. 3, the direction of the tape 4' extending between the leading tape guide 23 and the auxiliary inclined guide 31 coincides with the direction S of inclination of the auxiliary inclined guide 31, and the tape 4 is kept flat between the tape guide 23 and the auxiliary inclined guide 31. This condition will be referred to herein as "simple inclination".

On the other hand, in FIG. 4, the direction S of inclination of the auxiliary inclined guide 31 is different from the direction of the tape 4' extending between the leading tape guide 23 and the auxiliary inclined guide 31. When the auxiliary inclined guide 31 is inclined in this manner, the tape 4 is twisted. This condition will be referred to herein as "inclination-twist combination".

Upon reviewing the difference in the inclination direction of the auxiliary inclined guide 31, the direction of travel of the tape 4 is more changed at the auxiliary inclined guide 31 with the inclination-twist combination of FIG. 4 than with the simple inclination of FIG. 3. This indicates that the same correction effect can be obtained by a less inclination angle with the inclination-twist combination than with the simple inclination.

Next, a specific example of an auxiliary inclined guide 31 for winding the tape 4 uniformly around the leading tape guide 23 throughout the loading operation will now be described.

Proper positions of the angularly-moving auxiliary inclined guide 31 have been determined, using simulation calculations by a computer. More specifically, the degree of twist in the tape travel path for each condition during the loading or the unloading operation was calculated, and if there was a twist in the tape travel path, calculation was made regarding this as a tape travel height deviation with respect to the tape guide. This calculation method is based on the following.

Assuming that there is a twist in the tape travel path, the tape tends to travel not at a travel position defined or set by the flanges, but at a position where the twist is minimized. If the tape travel path is geometrically analyzed on the condition that the twist is minimized, the tape travel position where the twist is minimized can be found. As a result, if the difference (that is, tape travel height deviation) between the tape travel position, minimizing the twist, and the travel position defined by the flanges is calculated, it is thought that the magnitude of this deviation represents the magnitude of the tape twist.

Namely, if the tape travel height deviation is large, it is judged that the twist of the tape is large, so that damage to the tape is liable to occur in this loading path. In contrast, if the tape travel height deviation is small over the entire tape travel path, it is judged that the twist of the tape is small, so that the tape is subjected to less damage, thus providing the proper loading path.

In the calculations of this example, the diameter of the rotary drum 5 was 76 mm, the maximum angle of winding of the tape 4 on the rotary drum was 196°, and the lead angle was 4.9°. One example of an inclined posture of the auxiliary inclined guide 31 will now be described with reference to FIG. 4. The inclination direction angle Φ with respect to the leading tape guide 23 is about 12°, and the inclination angle with respect to the leading tape guide 23 is 6°. Namely, this is the auxiliary inclined guide of the inclination-twist combination type. As regards a calculation procedure, for each angular movement angle of the loading ring 14, the auxiliary inclined guide 31 of such an inclined posture was angularly moved about the leading tape guide 23, and such angular movement angle of the auxiliary inclined guide 31 as to make the above tape travel height deviation as small as possible was found.

Such proper angular movement angles of the auxiliary inclined guide 31 will now be described with reference to Table 1 and FIGS. 5 and 6, using results of calculation of the tape travel height deviation.

TABLE 1

(Angular position of auxiliary inclined guide during loading operation and Calculated values of tape travel height deviation)

| Suffix | (i)Angular movement angle of loading ring (°) | (ii)Angle of winding on drum (°) | Inclined guide | | Height deviation (mm) | |
|---|---|---|---|---|---|---|
| | | | (iii)Angular movement angle (°) | (iv)Tape winding angle (°) | (v)Inclined guide Provided | (vi)Inclined guide Not provided |
| a | 0 | 196.0 | 0.0 | 0.0 | 0.0 | 0.0 |
| b | 30 | 196.0 | 0.0 | 0.0 | 0.0 | 0.0 |

TABLE 1-continued (Angular position of auxiliary inclined guide during loading operation and Calculated values of tape travel height deviation)

| Suffix | (i)Angular movement angle of loading ring (°) | (ii)Angle of winding on drum (°) | Inclined guide | | Height deviation (mm) | |
|---|---|---|---|---|---|---|
| | | | (iii)Angular movement angle (°) | (iv)Tape winding angle (°) | (v)Inclined guide Provided | (vi)Inclined guide Not provided |
| c | 60 | 189.1 | 11.5 | 0.9 | 0.0 | 0.1 |
| d | 90 | 167.0 | 16.5 | 13.9 | 0.3 | 2.5 |
| e | 120 | 144.6 | 26.8 | 32.1 | 0.7 | 7.1 |
| f | 150 | 119.5 | 43.0 | 53.5 | 0.8 | 13.5 |
| g | 180 | 86.2 | 74.0 | 81.8 | 0.5 | 20.5 |
| h | 210 | 41.0 | 120.0 | 112.1 | 0.2 | 30.1 |
| i | 225 | 21.0 | 117.0 | 99.5 | 0.0 | 25.2 |
| j | 235 | 8.9 | 94.0 | 66.9 | 0.0 | 9.5 |

Figure 5:
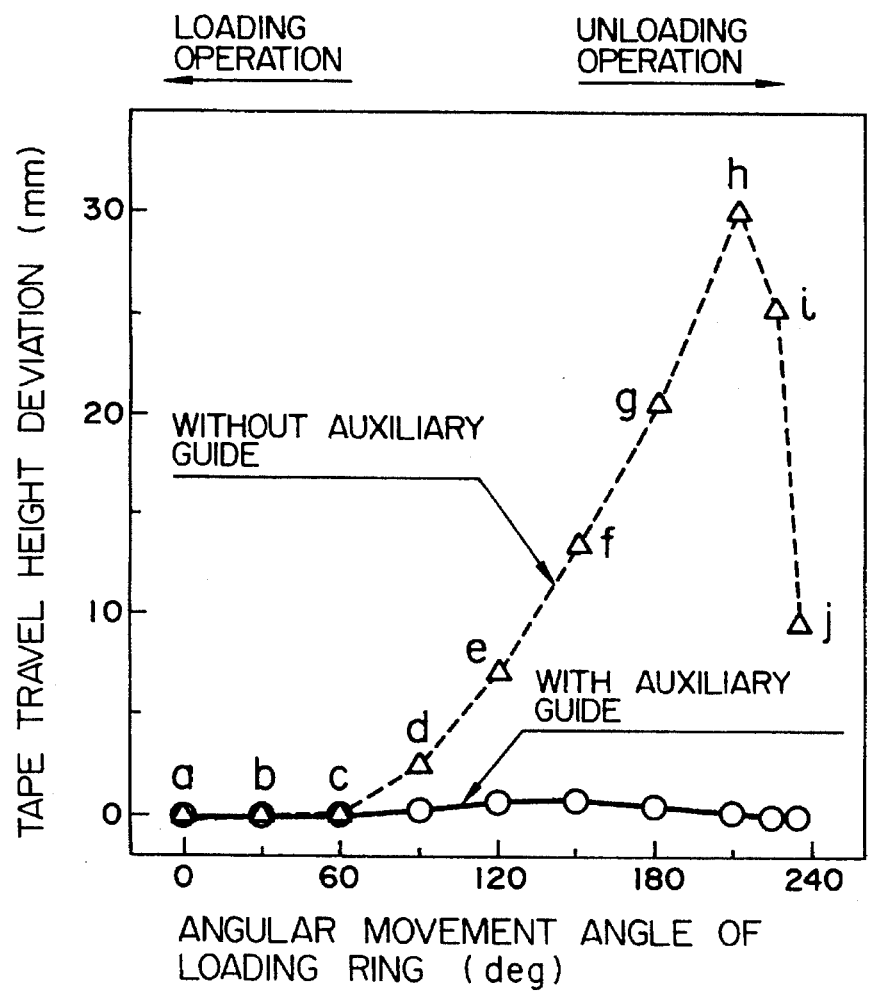
FIG. 5 is a diagram showing results of calculation of a tape travel height deviation during a loading operation.

Table 1 and FIG. 5 show the proper angular movement angles of the auxiliary inclined guide 31 throughout the loading operation, as well as results of calculations of the tape travel height deviation and so on. FIG. 6 shows that at each of the angular movement positions of the loading ring 14 shown in Table 1 and FIG. 5, the auxiliary inclined guide 31 angularly moves about the leading tape guide 23, thereby effecting the loading operation or the unloading operation. FIG. 6 is a plan view as seen in a direction perpendicular to the loading ring 14. In FIG. 6, although the tape guides 8, 9, 10 and 11 and the rotary drum 5 are not disposed perpendicular to the loading ring 14, all these parts are depicted as being disposed on a common plane for the reason given hereinbefore.

Figure 6:
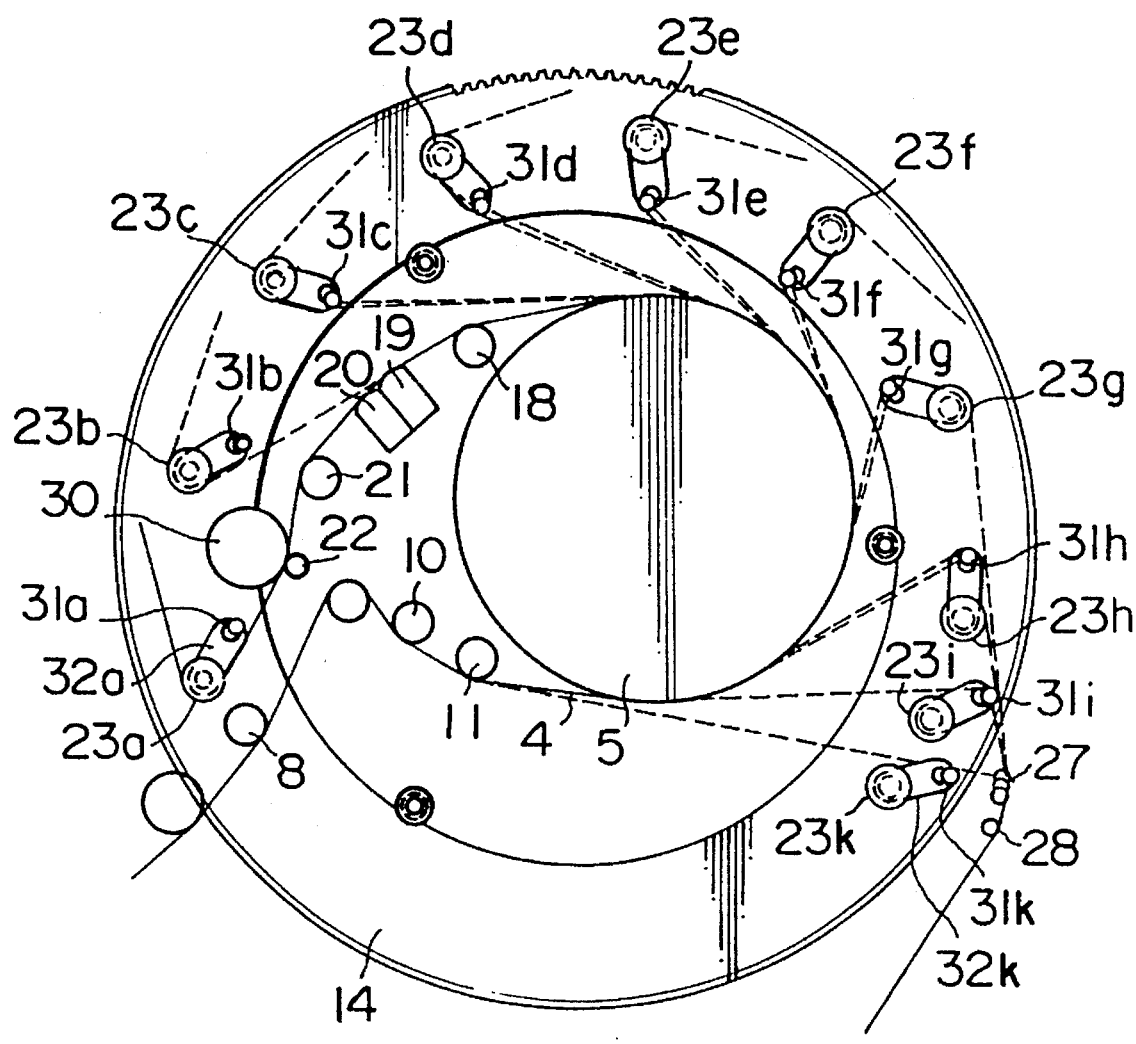
FIG. 6 is a plan view showing the position of a leading tape guide and the auxiliary inclined guide during the loading operation.

In Table 1 and FIGS. 5 and 6, suffixes a to k indicate the positions of the leading tape guide 23 and the auxiliary inclined guide 31 in accordance with the angular movement of the loading ring 14 during the loading operation or the unloading operation. Here, suffix k indicates a condition in which the auxiliary inclined guide 31 begins to engage the tape 4, and in this condition the tape 4 has not yet been wound on the rotary drum 5, and any tape travel height deviation does not occur, and therefore this is not included in the calculation results of Table 1 and FIG. 5. If the condition represented by suffix j is shown in FIG. 6, the illustration becomes less clear because of superimposed portions, and therefore the showing of this condition is omitted from FIG. 6.

Here, similarly to the above description, suffix a represents the loading-completed condition, and the angular movement angle of the loading ring 14 in this condition is 0°, as described above. The process of the loading operation or the unloading operation is represented by the angle of clockwise angular movement of the loading ring 14, using the loading-completed condition as a reference, and this is shown in Item (i) of Table 1. Namely, the operation in a direction from suffix a toward suffix j represents the unloading operation, and the angle of winding of the tape on the rotary drum 5 is decreasing. In contrast, the operation in a direction from suffix j toward suffix a represents the loading operation. The angle of winding of the tape on the rotary drum 5 at each angular movement angle of the loading ring 14 is shown in Item (ii). The angular movement angle of the auxiliary inclined guide 31 shown in Item (iii) represents the angle of clockwise angular movement of the auxiliary inclined guide 31 about the leading tape guide 23 relative to the loading ring 14, using the loading-completed condition as a reference. Item (iv) indicates the angle of winding of the tape 4 around the auxiliary inclined guide 31 thus angularly moved. As shown here, in the loading operation from the position j to the position a, the angle of winding of the tape 4 around the auxiliary inclined guide 31 increases progressively as the loading ring 14 is angularly moved from the position j to the position h to cause the tape 4 to be wound on the rotary drum 5. At the position h, the winding angle reaches a maximum value and a maximal value, and as the loading ring 14 further angularly moves from the position h to the position a, the angle of winding of the tape 4 on the auxiliary inclined guide 31 decreases progressively. Item (iv) shows that this operation is proper.

Items (v) and (vi) show the calculated values of the tape travel height deviation with and without the auxiliary inclined guide 31, respectively. The tape travel height deviation is calculated for all of the tape guides; however, here, the largest value among the values of all the tape guides at each angular movement angle of the loading ring shown in Item (i) is shown as a representative value. As described above, these tape travel height deviations were calculated, assuming that all of the tape guides are not provided with flanges for limiting the tape travel height, and in the actual loading or the actual unloading operation, the tape travel position is limited by the flanges, and therefore the tape will not actually deviate in an amount corresponding to the values shown here. However, it is indicated that the tape is subjected to a twist corresponding to the calculated values of the tape travel height deviation.

In FIG. 5, the abscissa axis represents the angular movement angle of the loading ring 14, and the ordinate axis represents the calculated values (shown in Items (v) and (vi) of Table 1) of the tape travel height deviation at the respective values of the angular movement angle of the loading ring 14. A broken line represents Item (vi) (the auxiliary inclined guide 31 of the present invention is not provided), and a solid line represents Item (v) (the auxiliary inclined guide 31 of the present invention is provided). As is clear from FIG. 5, without the auxiliary inclined guide 31, the tape travel height deviation of about 30 mm develops at the loading ring angular movement angle of about 210°. This indicates that the tape is subjected to a large twist, and that where the tape is thin, the tape will be damaged. In contrast, as will be appreciated, where the auxiliary inclined guide 31 is provided, and is suitably angularly moved about the leading tape guide 23 so as to keep the tape travel height deviation to as small a value as possible, the height deviation can be reduced to not more than 1 mm at the same loading ring angular movement angle, thereby reducing the twist from the tape, and therefore there is provided a tape loading device in which the tape is less susceptible to damage.

Figure 7:
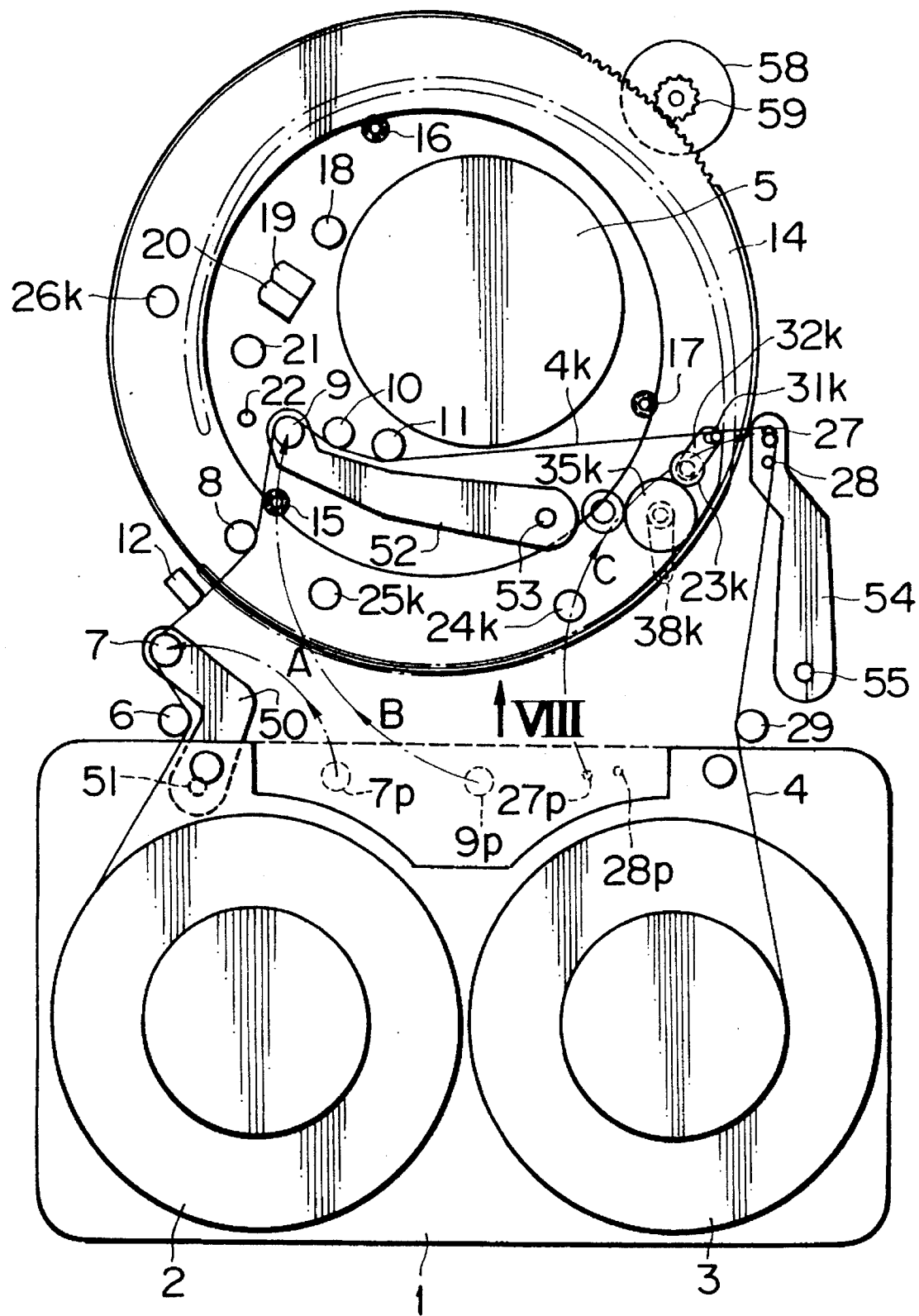
FIG. 7 is a view similar to FIG. 1, showing a third operating condition.
Figure 8:
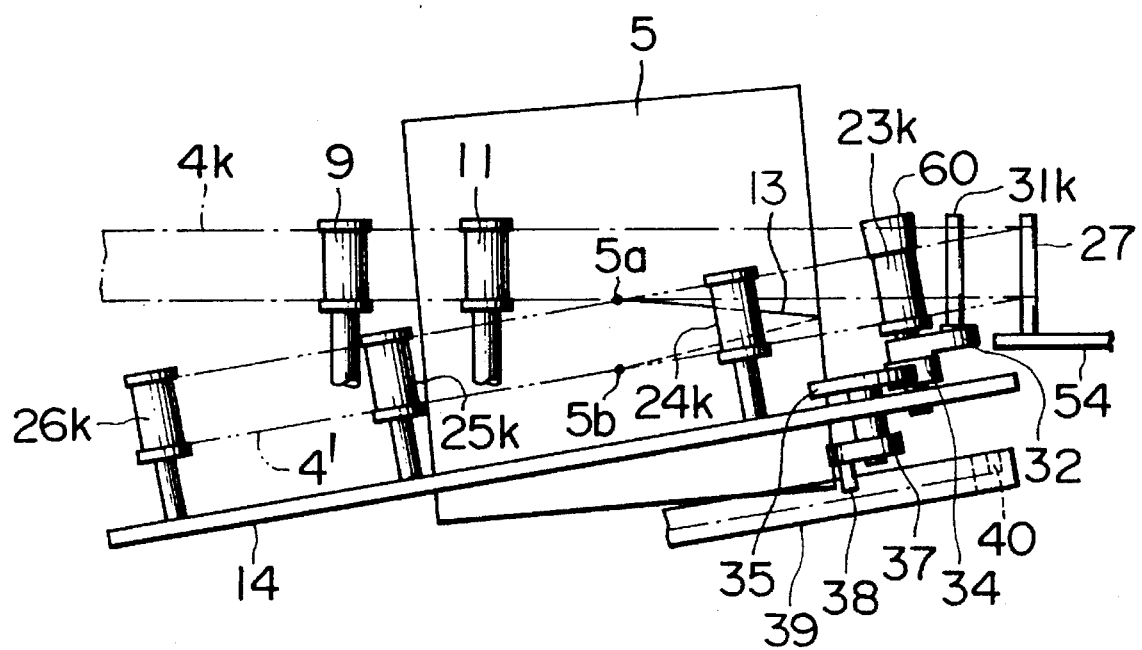
FIG. 8 is a side-elevational view as seen in a direction of arrow VIII of FIG. 7.

The construction for preventing damage to the tape when the tape take-out operation is started by the leading tape guide 23 will now be described with reference to FIGS. 7 and 8. FIG. 7 is a plan view showing a condition in which the tape take-out operation is started from the semi-loaded condition. FIG. 8 is a side-elevational view as the rotary drum is seen in a direction of arrow VII of FIG. 7. In FIG. 8, a lead 13 is provided on the rotary drum 5, and is defined or formed by a step for accurately positioning the tape 4 when the tape 4 is spirally wound on the rotary drum 5 over a predetermined angle. Reference numeral 4' denotes, in phantom, a tape travel path or plane in which the tape 4, disengaged from the tape disengaging point 5b of the rotary drum 5 in the loading-completed condition shown in FIG. 1, travels, and also denotes a tape travel path extending from the leading tape guide to the inclined post.

A tape travel path 4k in FIG. 7 shows a semiloaded condition. When the first take-out arm 50, the second take-out arm 52 and the third take-out arm 54 are angularly moved in directions A, B and C, respectively, the tape 4, received in the tape cassette 1, is taken out horizontally in the tape reel plane by the tape guide 7, the tape guide 9, the inclined post 27 and the tape guide 28, thereby forming the tape 4k in the semi-loaded condition.

In order to wind the semi-loaded tape 4k on the rotary drum 5, it is necessary to take out the tape 4k, disposed horizontally in the tape reel plane, by the leading tape guide on the loading ring 14. However, as shown in FIG. 8, the loading ring 14 and the leading tape guide 23k are inclined, and besides the leading tape guide 23k is disposed at a level lower than the tape 4k at the position where the leading tape guide 23k begins to contact the tape 4k. Therefore, if the auxiliary inclined guide 31k is not provided, so that the tape 4k must be taken out directly by the leading tape guide 23k, the upper edge of the tape 4k contacts an upper flange 60 of the leading tape guide 23k, so that the tape 4k is subjected to an uneven tension. Further, the leading tape guide 23k begins to take out the tape 4k while the leading tape guide 23k is kept inclined at an angle corresponding to the angle of inclination of the loading ring 14. Thus, the tape 4k is unduly taken out obliquely, and besides that portion of the tape 4k disposed in contact with the upper flange 60 is liable to be damaged. This is conspicuous particularly when a thin tape is used for long recording purposes, and damage to the tape in the loading operation or the unloading operation is a factor in hindrance to a thin design of the tape.

Figure 9:
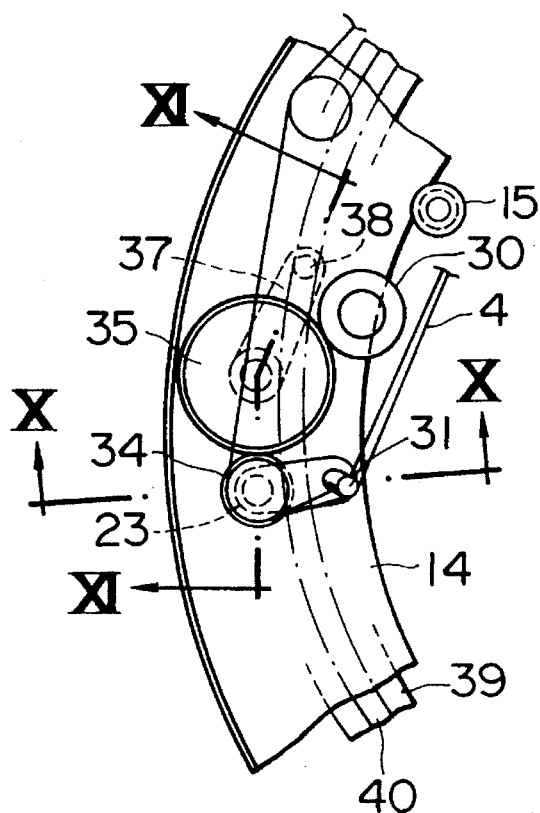
FIG. 9 is a fragmentary plan view showing a mechanism for angularly moving the auxiliary inclined guide.

On the other hand, when the auxiliary inclined guide 31k according to the present invention is provided, the direction of angular movement of the auxiliary inclined guide 31k relative to the leading tape guide 23k can be set properly, so that the auxiliary inclined guide 31k can be brought into contact with the tape 4k, disposed in the tape reel plane, before the leading tape guide 23k contacts the tape 4k, as shown in FIGS. 7 and 8. In this case, the inclination of the auxiliary inclined guide 31k is smaller than that of the leading tape guide 23k so that the it can contact the tape 4k in an almost perpendicularly-disposed condition. Furthermore, the auxiliary inclined guide 31k has no flange, and can contact the tape 4k generally uniformly, and therefore damage to the tape at the time when the tape begins to be taken out can be prevented. Next, the construction of a mechanism for angularly moving the above auxiliary inclined guide 31 will now be described with reference to FIGS. 9 to 11. FIG. 9 is a fragmentary view as seen in a direction perpendicular to the loading ring 14, FIG. 10 is a cross-sectional view taken along the line X—X of FIG. 9, and FIG. 11 is a cross-sectional view taken along the line XI—XI of FIG. 9.

Figure 10:
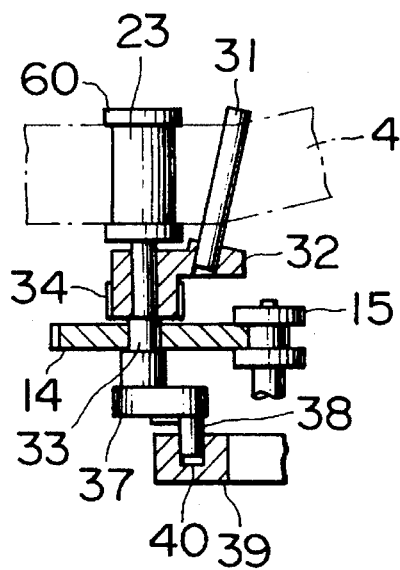
FIG. 10 is a cross-sectional view taken along the line X—X of FIG. 9.
Figure 11:
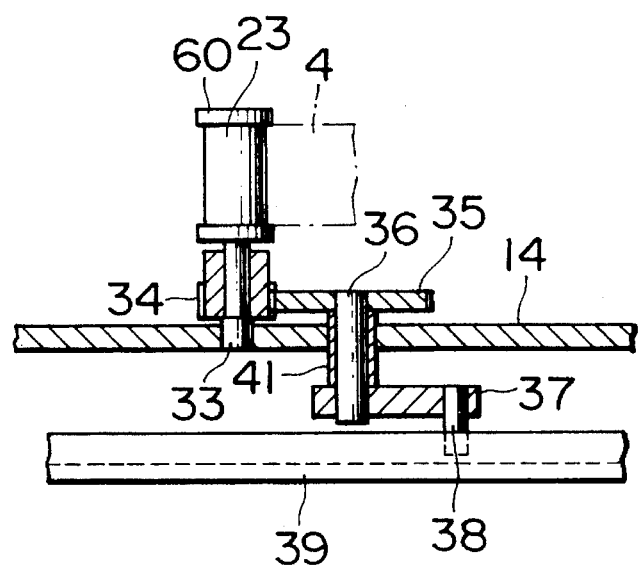
FIG. 11 is a cross-sectional view taken along the line XI—XI of FIG. 9.

In FIGS. 9 to 11, a shaft 33 of the leading tape guide 23 is fixedly mounted on the loading ring 14, the support link 32 is pivotally mounted on the shaft 33, and a first gear 34 is formed on the support link 32. A second gear 35 is in mesh with the first gear 34. When the second gear 35 rotates about an axis of a rotation of its center shaft 36, which is rotatably supported by a bearing 41 fixedly mounted on the loading ring 14, the first gear 34 rotates, so that the support link 32 and the auxiliary inclined guide 31, mounted on the support link 32, simultaneously rotate about the shaft 33 of the tape guide 23. A drive link 37 is connected to one end of the rotation center shaft 36, remote from the loading ring 14, and a link pin 38 is mounted on the drive link 37. A guide plate 39 has a guide groove 40, and is fixedly mounted on a body of the device, and is not moved even when the loading ring 14 rotates. The link pin 38 is received in the guide groove 40 for movement therealong. The pinch roller 30 is supported on the loading ring 14 by support means (not shown), and when the loading operation is completed, the pinch roller 30 is urged against the capstan 22, with the tape held therebetween.

Figure 12:
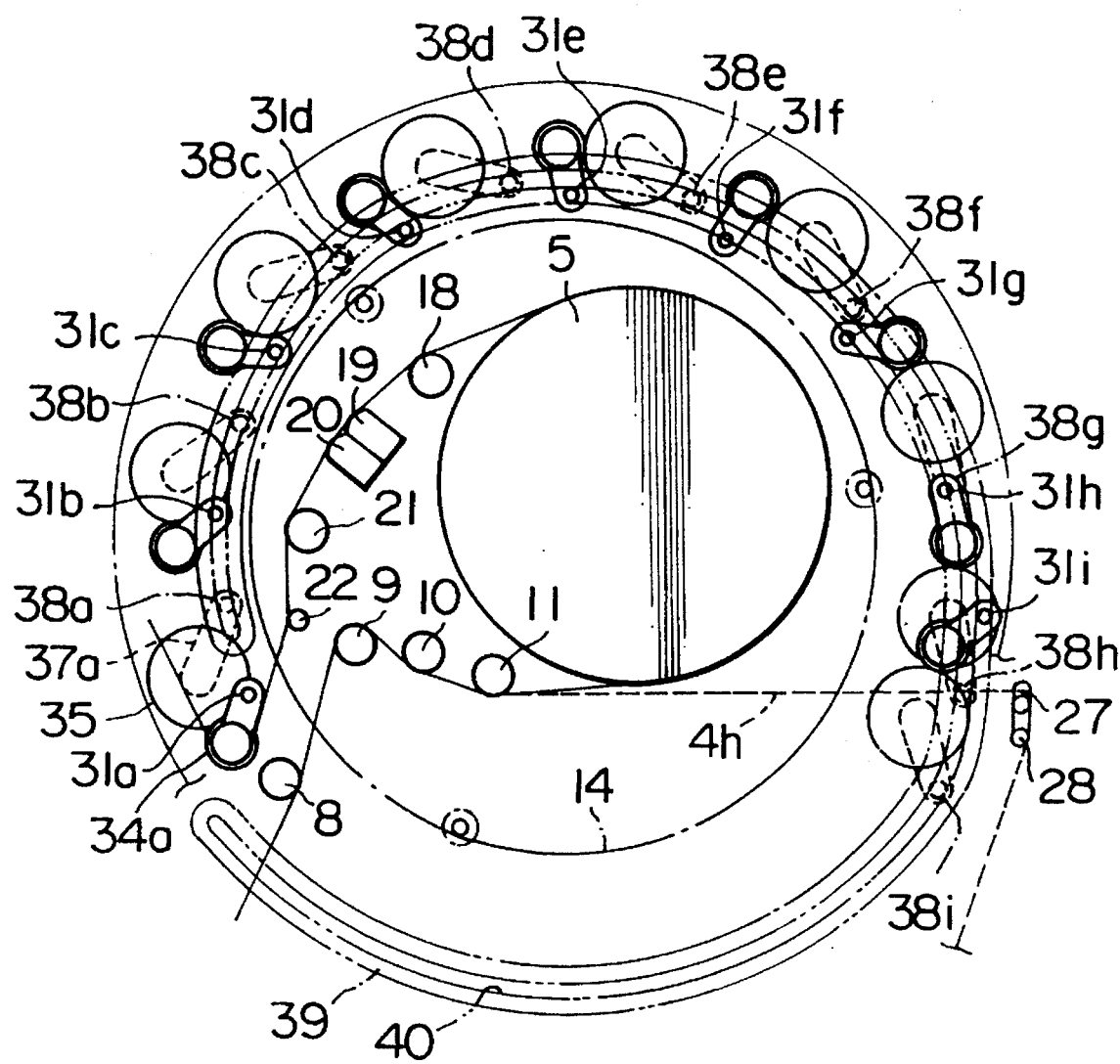
FIG. 12 is a plan view showing the operation of the angular movement mechanism for the auxiliary inclined guide during the loading operation.

One example of a configuration of the guide groove 40 for achieving the operation of the auxiliary inclined guide 31 shown in Table 1 and FIG. 5 will now be described. FIG. 12 shows the operation of the auxiliary inclined guide 31 shown in FIG. 6, as well as the mechanism for angularly moving the auxiliary inclined guide 31. Although the tape guides 8, 9, 10 and 11 and the rotary drum 5 are not disposed perpendicular to the loading ring 14, they are shown as being disposed on a common plane in FIG. 12. Although the auxiliary inclined guide 31 is also inclined as shown in FIG. 6, it is shown as being upright for illustration purposes. The gear number ratio of the second gear 35 to the first gear 34 is set to 2:1 as one example. By interconnecting the positions of the link pin 38, corresponding respectively to the angular movement angles of the loading ring 14, by a continuous curve as shown in FIG. 12, the angular movement of the auxiliary inclined guide 31 about the leading tape guide 23 can be achieved.

Next, these operations will now be described. Here, the loading operation will be described, and the unloading operation is reverse to the loading operation.

First, when the tape cassette 1, containing the supply tape reel 2 and the take-up tape reel 3, is put into the predetermined position, the tape guides 7, 9, 28 and the inclined guide 27 are located at their respective positions designated by 7p, 9p, 28p and 27p in FIG. 7, and are disposed within the tape cassette 1. Then, the first take-out arm 50, the second take-out arm 52 and the third take-out arm 54 are angularly moved about the respective rotation axes 51, 53 and 55 in the respective directions of arrows A, B and C (FIG. 7), thereby forming the tape 4k (FIG. 7) in the semi-loaded condition.

Then, when the pinion gear 59 is rotated clockwise by the motor 58, the loading ring 14 is rotated counterclockwise since the pinion gear 59 is in mesh with the gear formed on the outer periphery of the loading ring 14.

When the loading ring 14 rotates, a relative rotation occurs between the guide plate 39 and the loading ring 14 since the guide plate 39 is fixed. The guide groove 40 is generally spiral relative to the loading ring 14, and the link pin 38 is received in the guide groove 40 formed in the guide plate 39, and therefore the link pin 38 rotates about the rotation shaft 36 on the loading ring 14 in accordance with the rotation of the loading ring 14. Therefore, the drive link 37 and the second gear 35 both angularly move about the rotation shaft 36. The angular movement of the drive link 37 is transmitted to the first gear 34 via the second gear 35 to angularly move the support link 32 and the auxiliary inclined guide 31, mounted on the support link 32, to take out the tape 4k in the semi-loaded condition, so that the tape begins to be wound on the rotary drum 5 in a counterclockwise direction.

As the loading ring 14 angularly moves, the tape 4 is wound sequentially around the tape guides 24, 25 and 26 on the loading ring 14, so that the tape 4 is wound on the rotary drum 5.

When the loading ring 14 angularly moves until the loading-completed condition shown in FIG. 1 is obtained, the pinch roller 30 is pressed against the capstan shaft 22, and when the capstan shaft 22 rotates, the tape 4 is caused to travel in accordance with the speed of rotation of the capstan shaft 22.

Here, by using the read/write head mounted on the rotary drum 5, information can be written on and read from the tape 4.

Next, another example of a mechanism for angularly moving the support link 32 and the auxiliary inclined guide 31 on the loading ring 14 will now be described.

Figure 13:
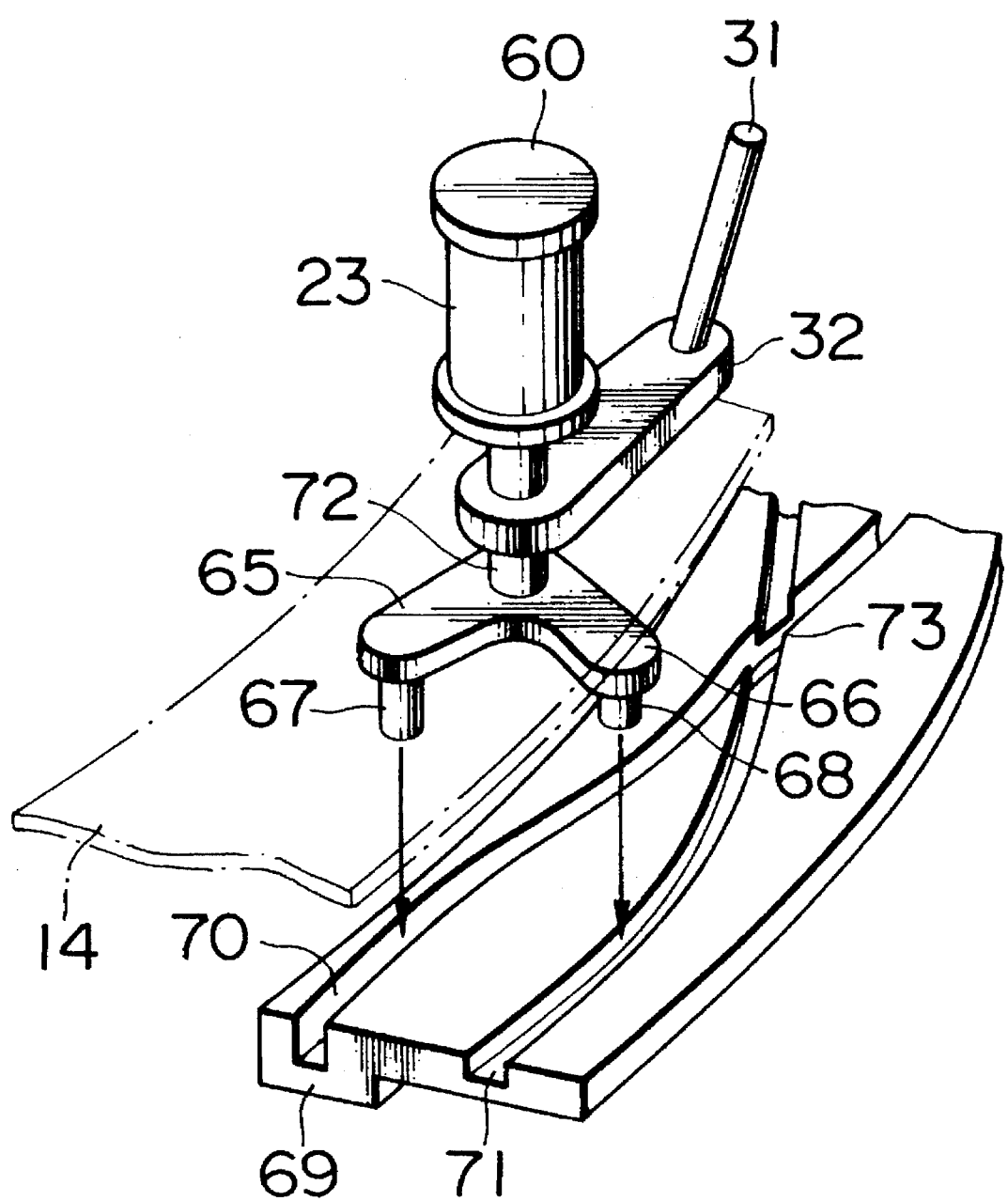
FIG. 13 is a fragmentary perspective view of another angular movement mechanism for the auxiliary inclined guide.
Figure 14:
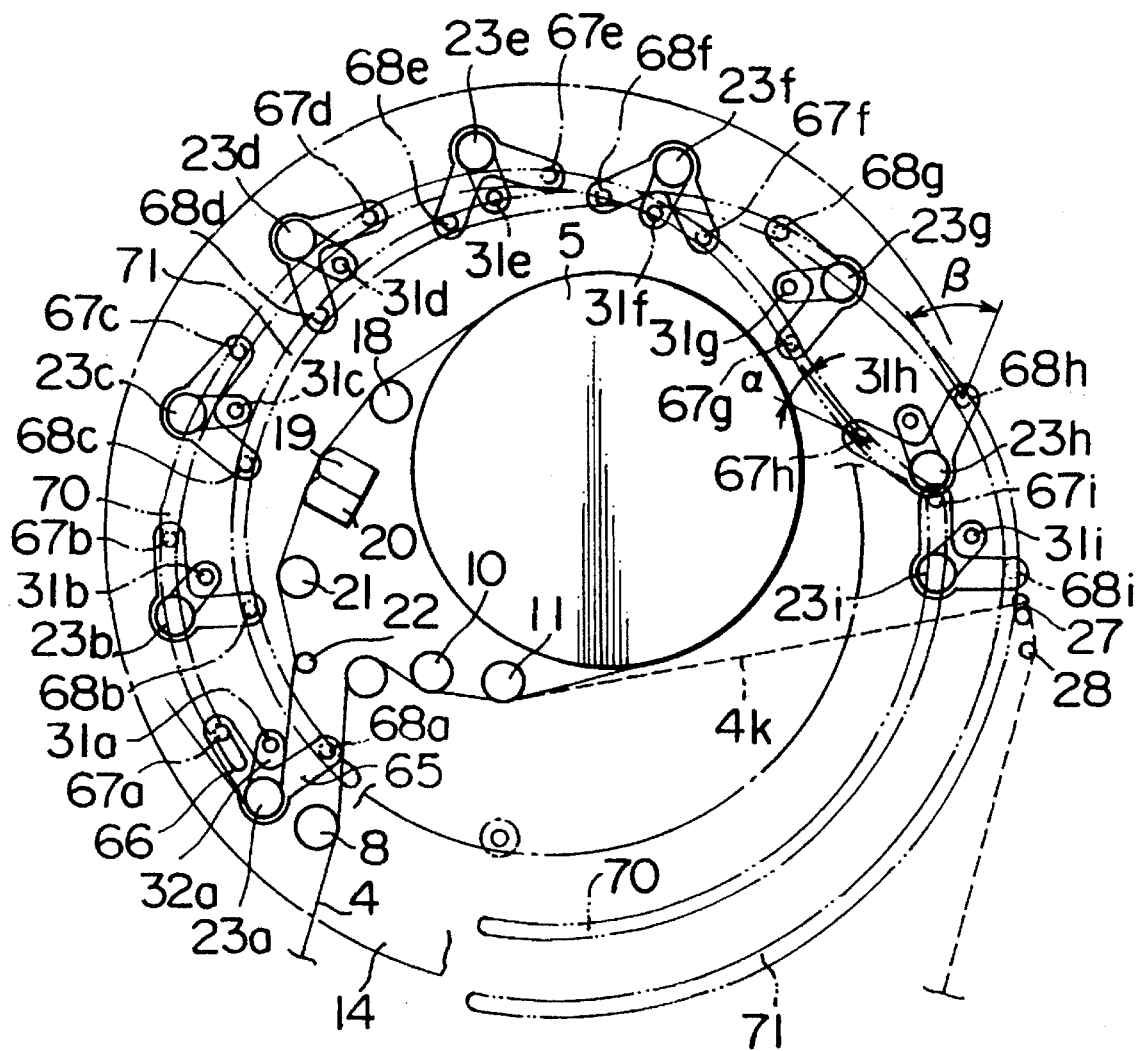
FIG. 14 is a plan view showing the operation of the angular movement mechanism for the auxiliary inclined guide during the loading operation.
Figure 15:
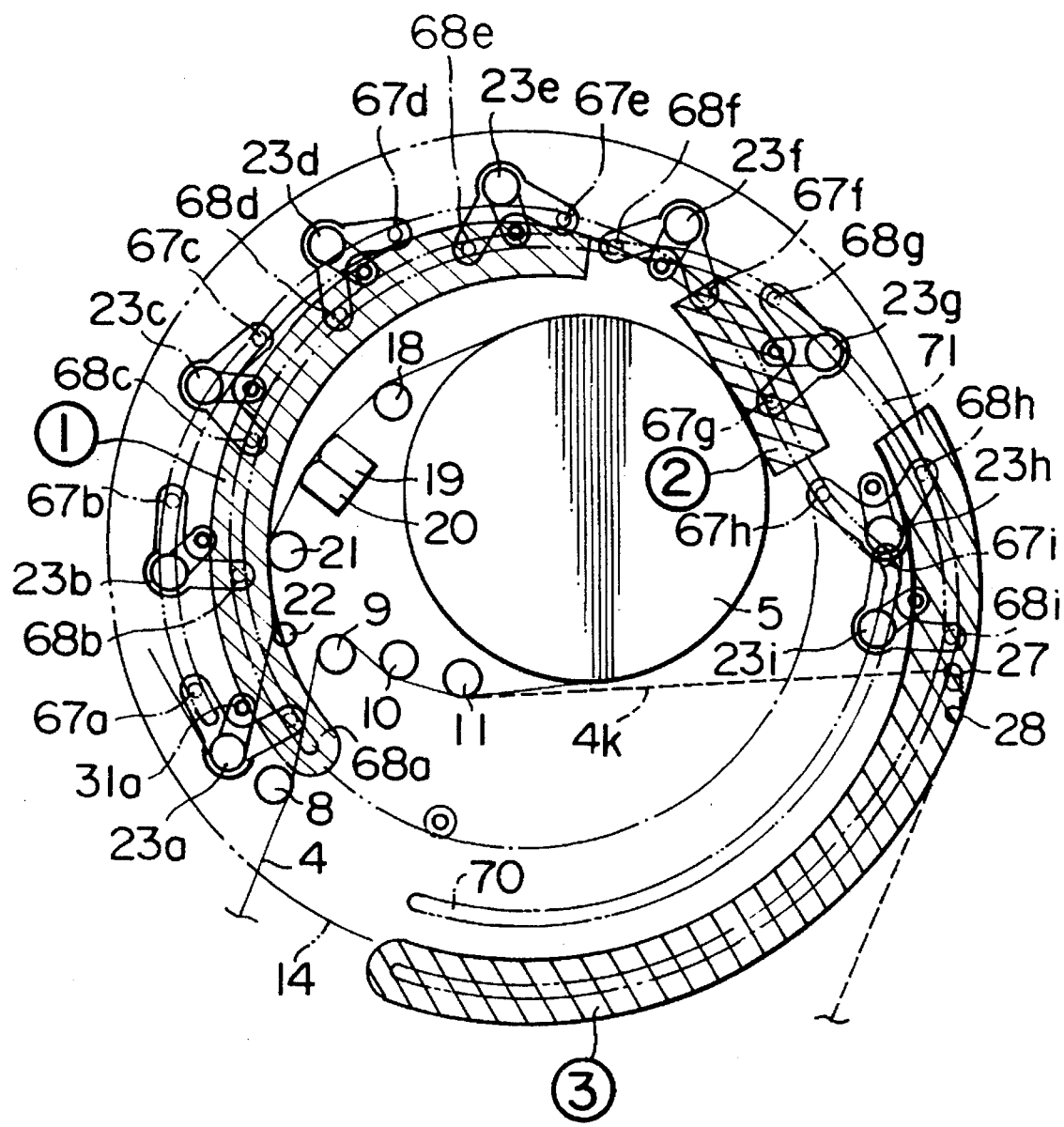
FIG. 15 is a plan view showing the operation of the angular movement mechanism for the auxiliary inclined guide during the loading operation.

FIG. 13 is a fragmentary perspective view of the above mechanism for angularly moving the support link 32 and the auxiliary inclined guide 31 on the loading ring 14, and FIGS. 14 and 15 are plan views showing the angular movements of the support link 32 and the auxiliary inclined guide 31, as seen in a direction perpendicular to the loading ring. Although the tape guides 8, 9, 10 and 11, the rotary drum 5 and the auxiliary inclined guide 31 are not disposed perpendicular to the loading ring 14, these parts are depicted as being disposed on a common plane in FIGS. 14 and 15.

In FIG. 13, reference numerals 65 and 66 denote a first drive link and a second drive link, respectively, which have a common rotation center shaft 72 that is rotatably mounted on the loading ring 14 so that the first and second drive links 65 and 66 rotate in unison about the rotation center shaft 72. A first link pin 67 is mounted on the first drive link 65, and a second link pin 68 is mounted on the second drive link 66. A guide plate 69 is fixedly supported, and a first guide groove 70 and a second guide groove 71 are formed in the guide plate 69. The first link pin 67 is received in the first guide groove 70, and the second link pin 68 is received in the second guide groove 71. The support link 32, the auxiliary inclined guide 31 and the leading tape guide 23 are fixed to the rotation center shaft 72, and rotate together with the first and second drive links 65 and 66.

The length of the first link pin 67 is greater than that of the second link pin 68, and the first guide groove 70 is deeper than the second guide groove 71. With this arrangement, when the first link pin 67 passes past an intersection 73 between the first and second guide grooves 70 and 71, the first link pin 67 is kept received only in the first guide groove 70, and therefore the first link pin can smoothly move therealong without shaking.

When the loading ring 14 angularly moves, the rotation center shaft 72 angularly moves together with the loading ring 14, and the first and second link pins 67 and 68 move along the first and second guide grooves 70 and 71, respectively. As a result, the first and second drive links 65 and 66, the support link 32 and the auxiliary inclined guide 31 angularly move about the rotation center shaft 72.

The operations of the first and second drive links 65 and 66, the support link 32 and the auxiliary inclined guide 31 throughout the loading operation, as well as the configurations of the first and second guide grooves 70 and 71, will now be described with reference to FIG. 14. In FIG. 14, the first and second drive links 65 and 66 are angularly spaced 90° from each other with respect to the rotation center shaft 72, and the support link 32 lies midway between the first and second drive links 65 and 66. The first and second link pins 67 and 68 are equidistant from the rotation center shaft 72. However, these dimension relations in this embodiment are not always necessary, and can be suitably determined in accordance with the positional relation with the neighboring parts and the total angular movement angle of the drive link 32.

The operations of the support link 32 and the auxiliary inclined guide 31 are the same as those shown in FIG. 6, and in accordance with the angular movement angle of the support link 32 depending on the angular movement angle of the loading ring 14, the positions of the first and second link pins 67 and 68 are determined. The various positions thereof are indicated by adding suffixes $\underline{a}$ to $\underline{i}$ as in FIG. 6. By interconnecting these positions by a continuous smooth curve, the configurations of the first and second guide grooves 70 and 71 can be determined.

The reason why the two guide grooves are required as in this embodiment will now be described. In FIG. 14, attention is now directed to the first link pin 67 and the first guide groove 70. In the position indicated by suffix $\underline{h}$, the first link pin 67h precedes the leading tape guide 23h, but in the position indicated by suffix $\underline{f}$, the leading tape guide 23f precedes the first link pin 67f. In the position of suffix g between these positions, the first link pin 67g is disposed generally perpendicular to the first guide groove 70. Namely, between the positions of suffix $\underline{f}$ and suffix $\underline{h}$, the first link pin 67 must pass past a point where the angle between the first link pin 67 and the first guide groove 70 is 90°. Such an operation can not be achieved with an arrangement having one guide groove and one link pin. If two guide grooves are provided, and the construction of this embodiment is provided, then the auxiliary inclined guide 31 can be rotated through about 180° during the loading operation, and the proper angular movement of the auxiliary inclined guide 31 as achieved with the mechanism of FIGS. 9 to 11 can be attained.

Where the two guide grooves are thus provided, restraint is effected at three points (that is, the three positions where the two link pins and the axis of rotation of the support link 32 are provided, respectively), and therefore it seems that the angular movement may be locked or prevented. Actually, however, since the two guide grooves do not need to function at the same time, such a situation can be avoided. This will now be described with reference to FIGS. 14 and 15. FIG. 15 is a view identical to FIG. 14, but hatching is applied to a region ② on the first guide groove 70 and regions ① and ③ on the second guide grooves 71.

In FIG. 14, attention is now directed to the angle α between a line interconnecting the first link pin 67 (67h) and the leading tape guide, and the first guide groove 70, as well as the angle β between a line, interconnecting the second link pin 68 (68h) and the leading tape guide, and the second guide groove 71. The first and second link pins 67 and 68 are angularly spaced 90° from each other, and therefore one of the angles α and β is less than 45° while the other angle is more than 45°. If the link pin with a larger angle (α or β) is fitted in the guide groove while the link pin with a smaller angle is not held in contact with the guide groove, the relevant parts will not be restrained at the three points at the same time, so that the angular movement will not be locked. In FIG. 15, the hatched regions are those regions where the angle between the line, interconnecting the link pin and the leading tape guide, and the guide groove is more than 45°. In these regions, the width of each guide groove is made larger than the diameter of the associated link pin. Thus, one of the first and second link pins 67 and 68 is disposed outside the hatched regions, and is fitted in the associated groove, and therefore the predetermined angular movement of the auxiliary inclined guide 31 can be effected throughout the loading operation.

In the above embodiment, although the auxiliary inclined guide 31 angularly moves about the rotation center shaft 33 of the leading tape guide 23, this is not always necessary, and the auxiliary inclined guide 31 may angularly move about an axis other than that of the leading tape guide 23.

In the above embodiment, although the groove(s) for angularly moving the auxiliary inclined guide 31 is provided on the reverse side of the loading ring, the groove for angular movement of the auxiliary inclined guide may be provided on the same side as the loading ring, for example, in such a manner that the auxiliary inclined guide 31 is disposed between the groove and the loading ring.

Next, a second embodiment of a tape loading device of the invention employing an auxiliary inclined guide 31 will now be described with reference to FIGS. 16 to 19.

Figure 16:
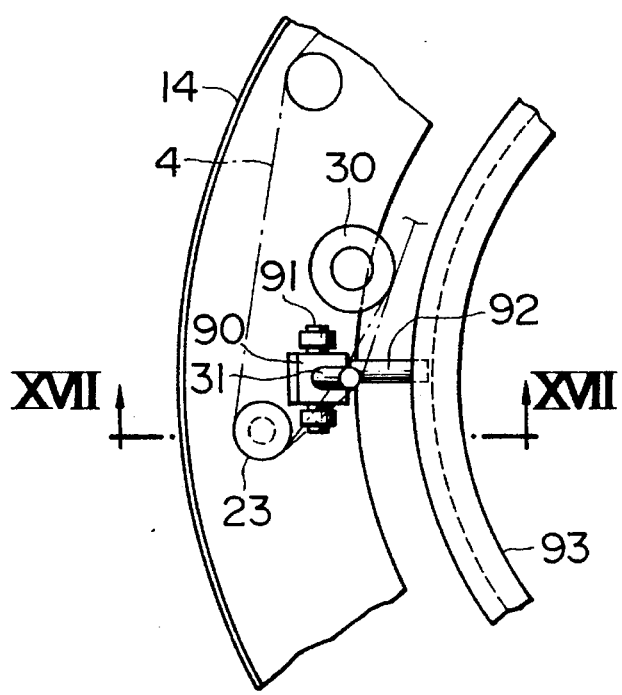
FIG. 16 is a fragmentary plan view of an inclining mechanism for an auxiliary inclined guide in a second embodiment of the present invention.
Figure 17:
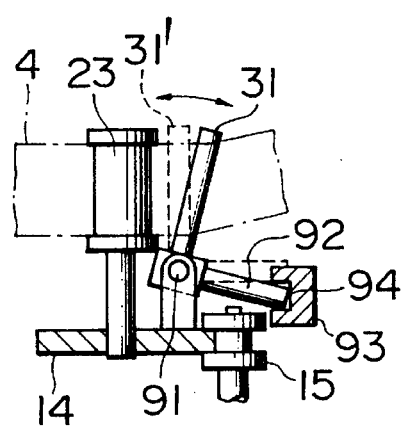
FIG. 17 is a cross-sectional view taken along the line XVII—XVII of FIG. 16.

FIG. 16 is a fragmentary plan view showing a mechanism for inclining the auxiliary inclined guide 31 in the tape loading device of the second embodiment, and FIG. 17 is a cross-sectional view taken along the line XVII—XVII of FIG. 16.

In FIGS. 16 and 17, the auxiliary inclined guide 31 is mounted on a guide base 90 in an upstanding manner, and a guide shaft 91 is supported parallel to a loading ring 14. The guide base 90 is supported on the guide shaft 91 for rotation about it. A swing shaft 92 is mounted on the guide base 90, and a guide member 93 is provided along the inner periphery of the loading ring 14, and a guide groove 94 is formed in an outer periphery of the guide member 93. The swing shaft 92 is received in the guide groove 94. When the loading ring 14 angularly moves, the height of the guide groove 94 with respect to the loading ring 14 is varied, so that the swing shaft 92 rotates about the guide shaft 91, thereby swinging the auxiliary inclined guide 31.

With this construction, the angle of inclination of the auxiliary inclined guide 31 is varied in accordance with the tape travel height deviation described above in Item (vi) of Table 1, and more specifically when the height deviation increases, this inclination angle is increased, and when the height deviation is reduced to zero upon completion of the loading operation, the auxiliary inclined guide 31 is disposed upright or perpendicular relative to the loading ring 14. By doing so, the tape travel height deviation during the loading operation can be reduced as in the first embodiment.

Figure 18:
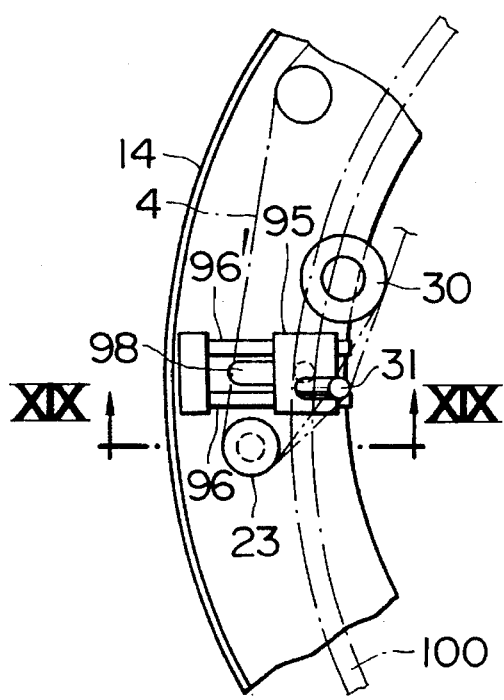
FIG. 18 is a fragmentary plan view showing a moving mechanism for an auxiliary inclined guide in a third embodiment of the present invention.

A third embodiment of the invention will now be described with reference to FIGS. 18 and 19. FIG. 18 is a fragmentary plan view showing a mechanism for moving an auxiliary inclined guide 31 in a tape loading device, and FIG. 19 is a cross-sectional view taken along the line XIX—XIX of FIG. 18.

Figure 19:
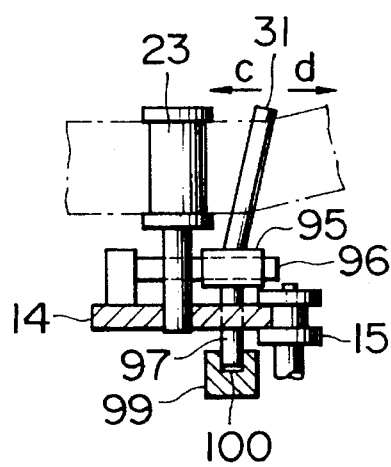
FIG. 19 is a cross-sectional view taken along the line XIX—XIX of FIG. 18.

In FIGS. 18 and 19, the auxiliary inclined guide 31 is mounted on a guide base 95 in an inclined manner, and guide shafts 96 and 96' are supported parallel to a loading ring 14. The guide base 95 is supported on the guide shafts 96 and 96' for linear movement therealong. A drive shaft 97 is mounted on the guide base 95, and extends through the loading ring 14. A hole 98 is formed through the loading ring 14, and allows the drive shaft 97 to move in the range of linear movement of the guide base 95 along the guide shafts 96 and 96'. A guide member 99 is fixedly mounted along the loading ring 14, and a guide groove 100 is formed in an upper surface of the guide member 99. The drive shaft 97 is received in the guide groove 100. When the loading ring 14 angularly moves, the position of the guide groove 100 relative to the loading ring 14 is varied, so that the drive shaft 97 linearly moves along the guide shafts 96 and 96', and therefore the auxiliary inclined guide 31 linearly moves together therewith. When the auxiliary inclined guide 31 moves in a direction of arrow $\underline{c}$ (FIG. 19), the angle of winding of the tape 4 around the auxiliary inclined guide 31 decreases, and when the auxiliary inclined guide 31 moves in a direction of arrow $\underline{d}$, the angle of winding of the tape 4 around the auxiliary inclined guide 31 increases.

With this construction, the auxiliary inclined guide 31 is moved in accordance with the tape travel height deviation described above in Item (vi) of Table 1, and more specifically when the height deviation increases, the auxiliary inclined guide 31 is moved in the direction of arrow $\underline{d}$ (FIG. 19) to increase the angle of winding of the tape 4 around the auxiliary inclined guide 31, and when the height deviation decreases, the auxiliary inclined guide 31 is moved in the direction of arrow $\underline{c}$ (FIG. 19) to decrease the angle of winding of the tape 4. By doing so, the tape travel height deviation during the loading operation can be reduced as in the first embodiment.

Next, a fourth embodiment of a tape loading device of the invention will be described.

Figure 20:
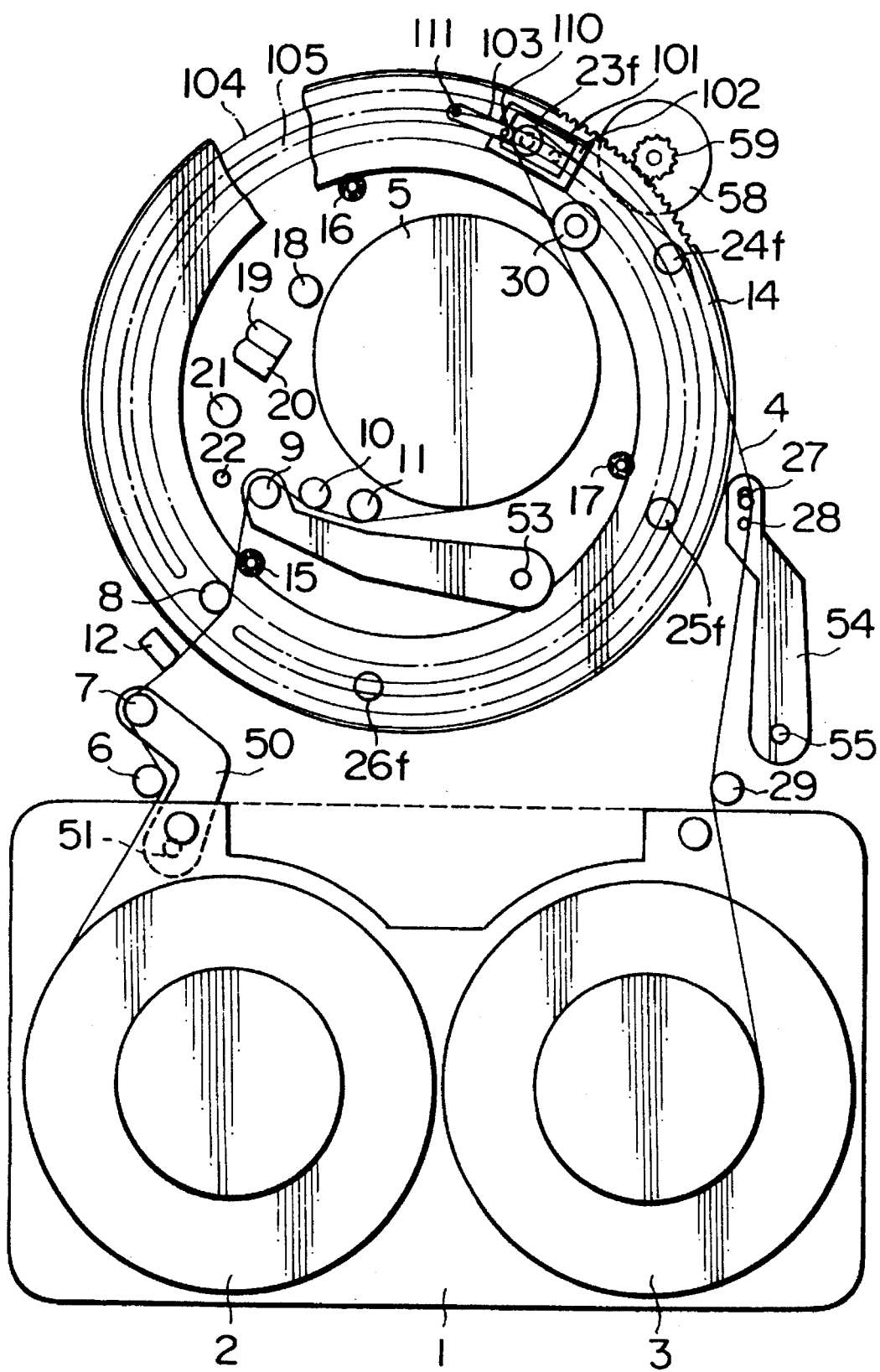
FIG. 20 is a plan view showing the construction of a tape loading device according to a fourth embodiment of the present invention.

FIG. 20 is a plan view of the fourth embodiment of the tape loading device of the invention, and shows a condition during a loading operation, in which a loading ring 14 is angularly moved 150° from a loading-completed condition, as in FIG. 2 showing the first embodiment. In FIG. 20 as in FIGS. 1 and 2, although part of a travel path of a tape 4, a rotary drum 5, a loading ring 14, tape guides mounted on the loading ring, and so on are actually inclined, these parts are depicted as disposed upright on a common plane for illustration purposes.

In FIG. 20, a leading tape guide 23 is mounted on a moving member 101 in an upstanding manner, and a hole 102, which is larger in size than the moving member 101, is formed through the loading ring 14. The moving member 101 is received in the hole 102. A drive pin 110 is mounted on the moving member 101 in an upstanding manner, and a drive pin 111 is mounted on the loading ring 14 in an upstanding manner. A connecting link 103 has opposite ends fitted respectively on the drive pins 110 and 111, and interconnects the loading ring 14 and the moving member 101. A guide plate 104 is provided along the loading ring 14, and a guide hole 105 is formed through the guide plate 104. The moving member 101 is connected to the loading ring 14 by the connecting link 103 and the drive pins 110 and 111, and therefore when the loading ring 14 angularly moves, the moving member 101 moves, together with the loading ring 14, along the guide hole 105 formed in the guide plate 104. Other construction and operation than the above are similar to those of the first embodiment.

Figure 21:
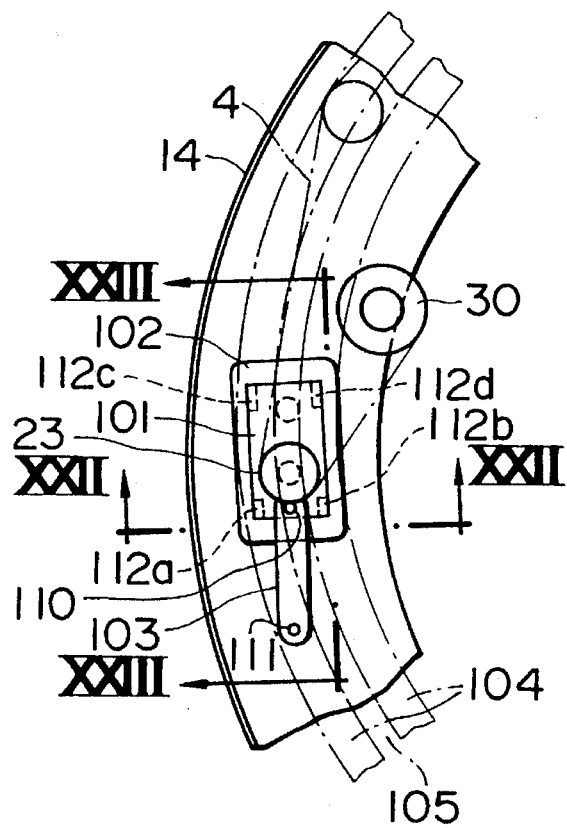
FIG. 21 is a fragmentary plan view showing the vicinity of a leading tape guide in the fourth embodiment.

Next, one example of a construction in the vicinity of the leading tape guide 23 and the moving member 101 will be described with reference to FIGS. 21 to 23. FIG. 21 is a fragmentary plan view showing the vicinity of the leading tape guide in this embodiment, FIG. 22 is a cross-sectional view taken along the line XXII—XXII of FIG. 21, and FIG. 23 is a cross-sectional view taken along the line XXIII—XXIII of FIG. 21.

Figure 22:
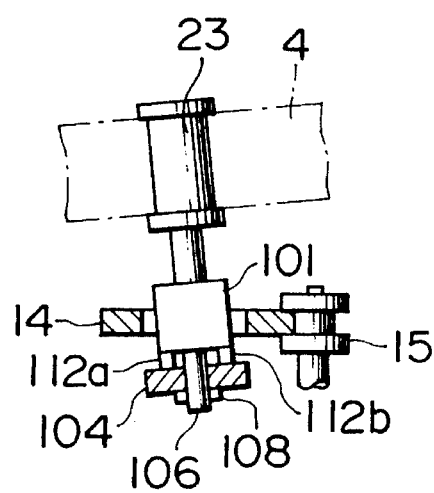
FIG. 22 is a cross-sectional view taken along the line XXII—XXII of FIG. 21.
Figure 23:
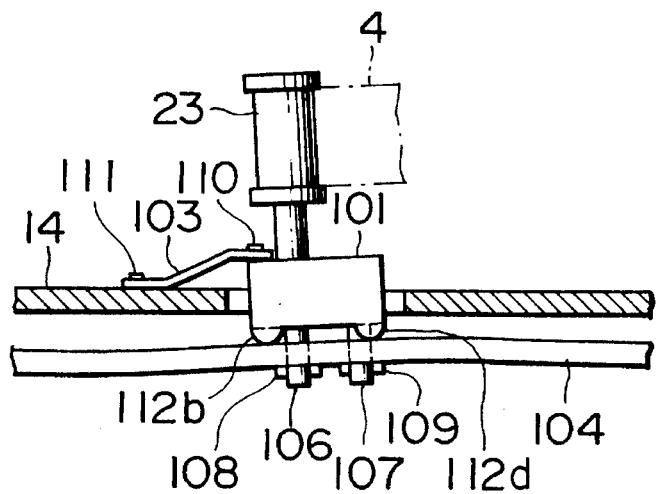
FIG. 23 is a cross-sectional view taken along the line XXIII—XXIII of FIG. 21.

In FIGS. 21, 22 and 23, guide shafts 106 and 107 are mounted on the moving member 101, and are received in the guide hole 105, and retainers 108 and 109 are provided on the guide shafts 106 and 107, respectively. Projections 112a, 112b, 112c and 112d are formed on the moving member 101, and the moving member 101 is in contact with the guide plate 104 through these projections 112a, 112b, 112c and 112d. Namely, the moving member 101 is supported in such a manner that the guide plate 104 is interposed between the projections 112a, 112b, 112c and 112d and the retainers 108 and 109.

When the loading ring 14 rotates, the moving member 101, connected thereto by the connecting link 103 and the drive pins 110 and 111, moves along the guide hole 105 in the guide plate 104. Here, when the height and inclination of the guide plate 104 are varied with respect to the loading ring 14, the moving member 101 and the leading tape guide 23 mounted thereon are correspondingly moved in a three-dimensional manner while varying their height and inclination.

With this construction, the leading tape guide 23 is inclined in accordance with the tape travel height deviation described above in Item (vi) of Table 1, and more specifically when the height deviation increases, the leading tape guide 23 is inclined generally in the direction of proceeding of the loading operation to eliminate the difference in tension between the upper and lower edges of the tape 4 which difference develops when the leading tape guide 23 is disposed upright on the loading ring 14. As a result, the tape travel height deviation, developing between the leading tape guide 23 and the rotary drum 5, can be reduced.

Figure 24:
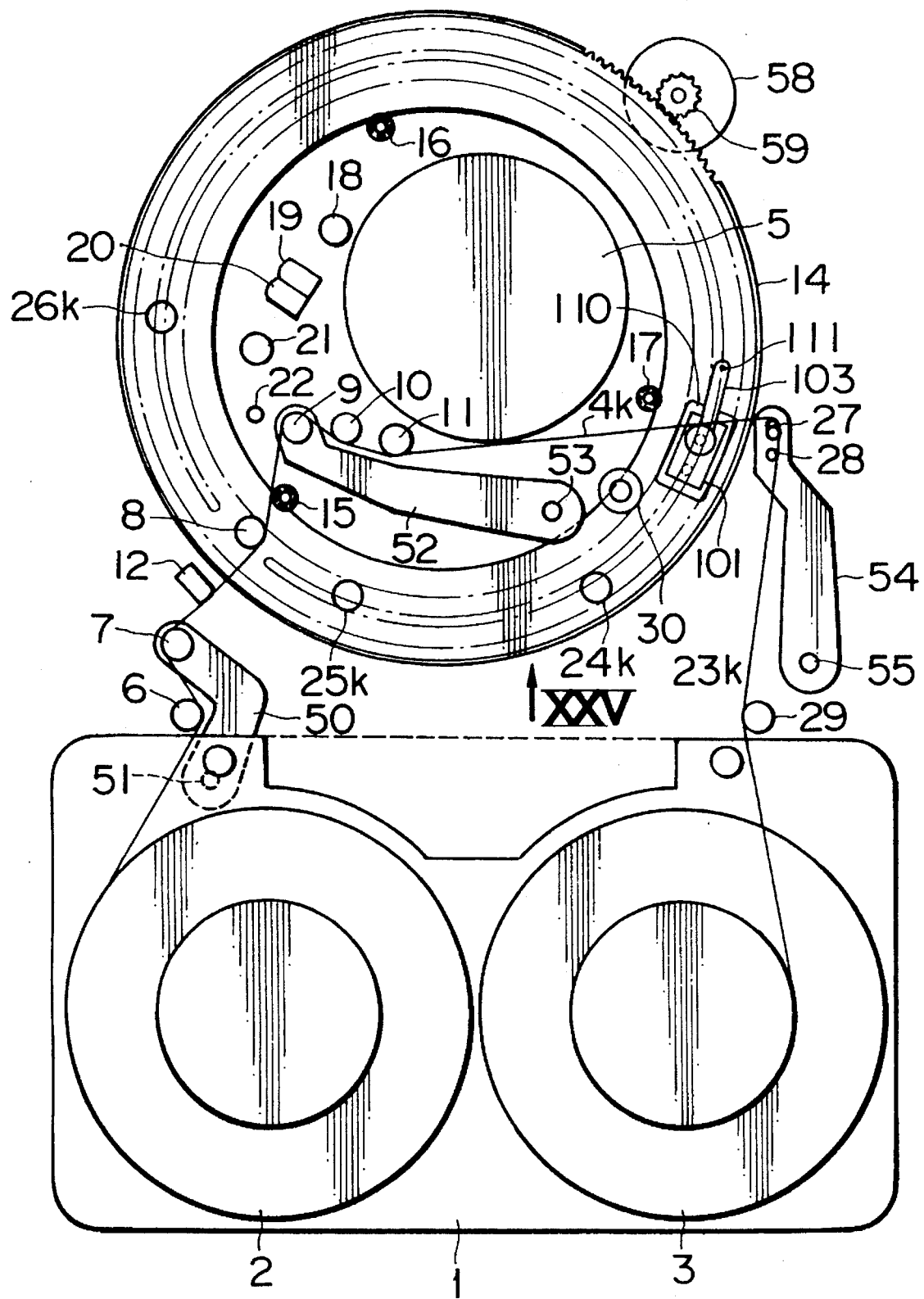
FIG. 24 is a plan view showing the construction of the tape loading device of the fourth embodiment.
Figure 25:
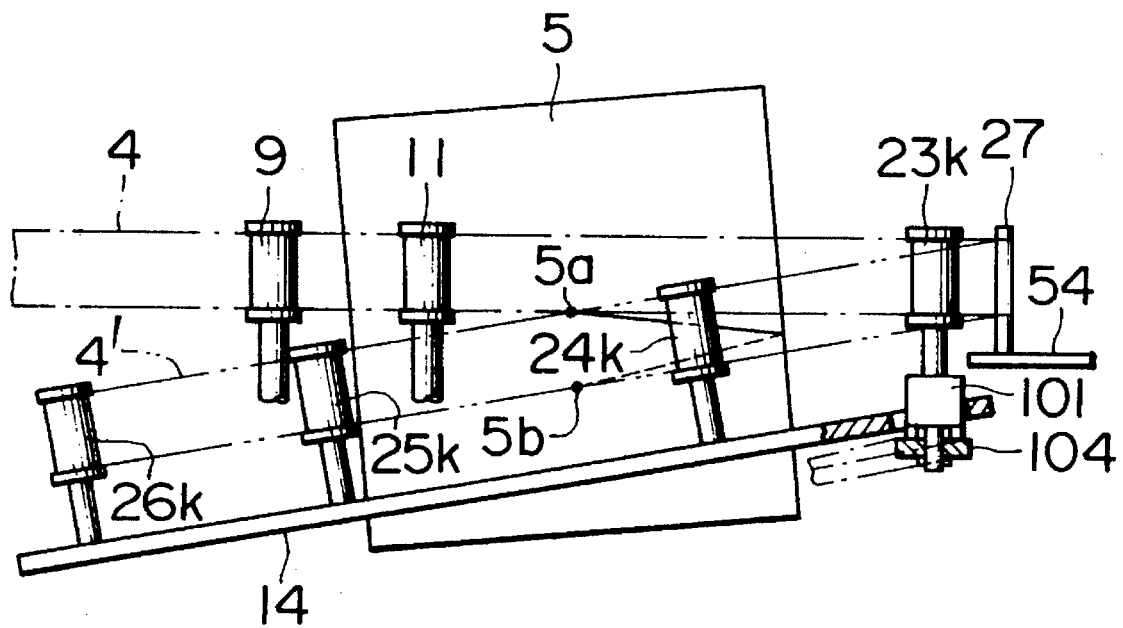
FIG. 25 is a side-elevational view showing the construction of the tape loading device of the fourth embodiment.

Next, the construction for preventing the tape from being damaged when the leading tape guide 23 begins to take out the tape will be described with reference to FIGS. 24 and 25, corresponding respectively to FIGS. 7 and 8. FIG. 24 is a plan view showing a condition in which the tape take-out operation is started from a semi-loaded condition. FIG. 25 is a side-elevational view as the rotary drum is seen in a direction of arrow XXV of FIG. 24. Although the rotary drum 5, the loading ring 14, the tape guides mounted on the loading ring, and so on are actually inclined, these parts are depicted as disposed upright on a common plane in FIG. 24.

In FIG. 24, the tape 4k is in a semi-loaded condition as in FIG. 7, and is extended in the same horizontal plane as that of tape reels 2 and 3, and the leading tape guide 23 is just contacted with the tape 4. In this position, the guide plate 104 and the guide hole 105 can be so arranged that the leading tape guide 23 can be disposed upright as shown in FIG. 25, and that the leading tape guide 23 can be disposed on the same horizontal plane as that of the tape reels 2 and 3. Reference numeral 4' denotes, in phantom, a tape travel path or plane in which the tape 4, disengaged from a tape disengaging point 5b of the rotary drum 5 in the loading-completed condition, travels, and also denotes a tape travel path extending from the leading tape guide to an inclined post.

With this arrangement, when the tape 4 begins to be taken out from the semi-loaded condition, the leading tape guide 23 is disposed at the same level as the tape 4, and can contact the tape perpendicularly. Therefore, the tape 4 will not slide over the flange, and will not be taken out obliquely. Therefore, there can be provided a tape loading device which prevents the tape 4 from being damaged when the tape 4 begins to be taken out, and which hence is highly reliable.

The configurations of the guide plate 104 and the guide hole 105 are so determined that after the tape 4 is taken out, the leading tape guide 23 is gradually inclined so that the tape 4 can be uniformly wound around the leading tape guide 23 during the loading operation.

A fifth embodiment of the invention will now be described. In this embodiment, the invention is applied to a construction in which only a supply tape reel is contained in a tape cartridge in contrast with the above embodiments in which the supply tape reel 2 and the take-up tape reel 3 are contained in the tape cassette.

Figure 26:
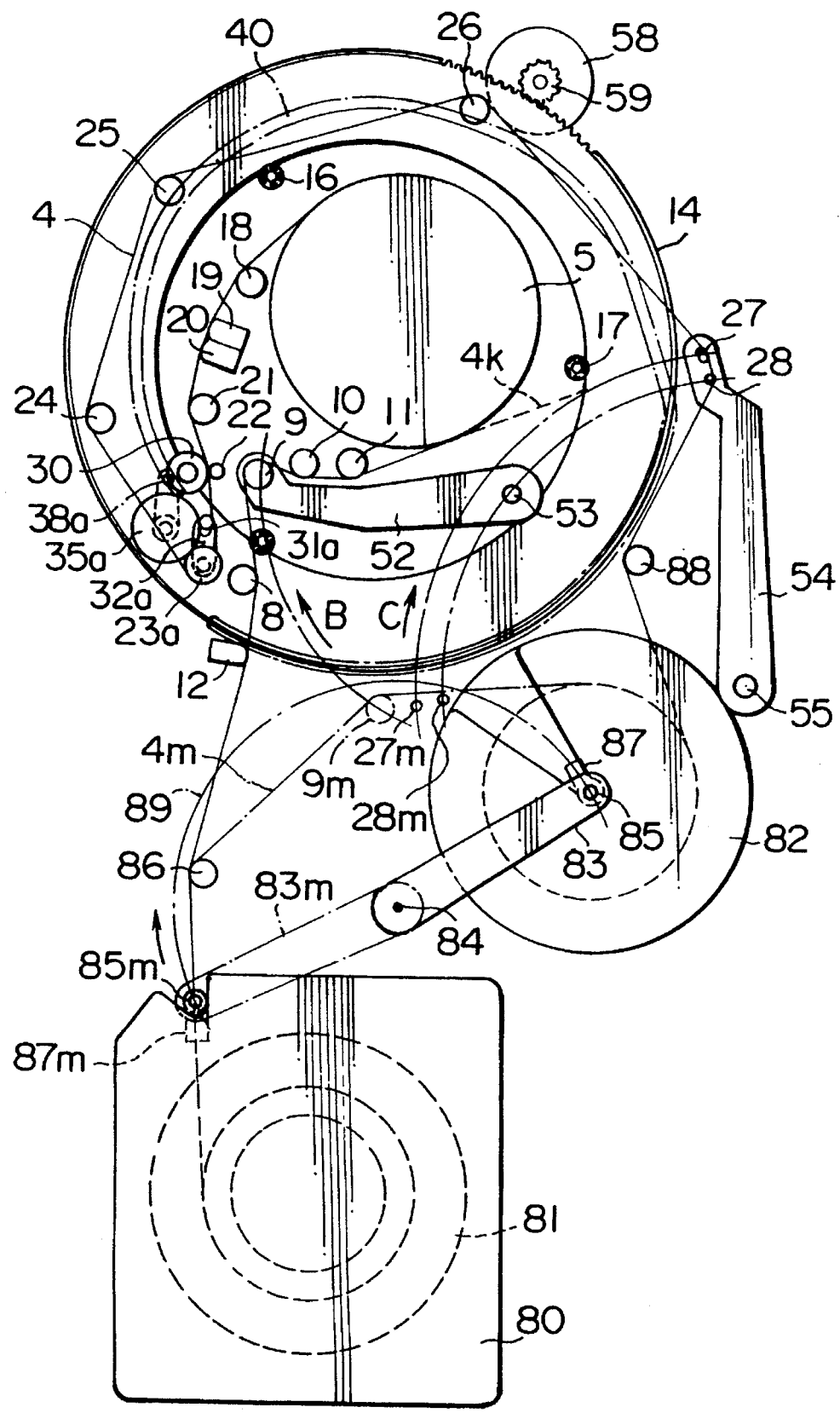
FIG. 26 is a plan view showing the construction of a tape loading device according to a fifth embodiment of the present invention.

FIG. 26 is a plan view showing a condition in which a tape loading operation is completed, and the tape is wound on a rotary drum over a predetermined angle. Although part of a travel path of the tape 4, the rotary drum 5, a loading ring 14, tape guides mounted on the loading ring, and so on are actually inclined, these parts are depicted as disposed upright on a common plane in FIG. 26 as in FIGS. 1, 2 and 7.

In FIG. 26, a supply tape reel 81 has the tape 4 wound thereon, and a removable tape cartridge 80 contains the supply tape reel 81, and this tape cartridge 80 with the supply tape reel 81 is fixed in a predetermined position by fixing means (not shown). A tape take-out member 87 is fixedly secured to one end of the tape 4 wound on the supply tape reel 81. Reference numeral 82 denotes a take-up tape reel which is not removable. A threading means 83 is mounted for rotation about a rotation axis 84, and has at one end a grasping means 85 for grasping the tape take-out member 87 so as to take out the tape 4 to bring the tape to the take-up tape reel 82. Reference numerals 86 and 88 denote fixed tape guides. Other construction than the above embodiment is the same as that of the embodiment of FIGS. 1 and 2, and identical reference numerals denote identical or corresponding parts, respectively. Reference numerals 9m, 27m, 28m, 83m, 85m and 87m respectively indicate the positions of a tape guide 9, an inclined post 27, a tape guide 28, the threading means 83, the grasping means 85 and the tape take-out member 87 before the tape 4 is loaded. Here, the members 86, 9m, 27m and 28m are disposed inside a path 89 of movement of the grasping means 85 and the tape take-out member 87.

The operation of this embodiment will now be described.

When the tape cartridge 80 containing the supply tape reel 81 is put in the predetermined position, the tape take-out member 87m, mounted on one end of the tape 4, is grasped by the grasping means 85m on the threading means 83m. Then, the threading means 83 angularly moves about the rotation axis 84 in a clockwise direction to move the tape take-out member 87 to the take-up tape reel 82 along its movement path 89, while taking out the tape 4. When the tape take-out member 87 is attached to the take-up tape reel 82, the tape 4 is wound around the fixed guide 86, the tape guide 9m and the fixed guide 28m to form a tape travel path 4m shown in FIG. 26. Then, a second take-out arm 52 and a third take-out arm 54 angularly move about their respective rotation axes 53 and 55 in directions of arrows B and C, respectively, to take out the tape 4 into a semi-loaded position designated by 4k. The semi-loaded position 4k in FIG. 26 is identical in positional relation to the semi-loaded position of FIG. 7.

The loading ring 14 is angularly moved from this condition to angularly move the leading tape guide 23 and an auxiliary inclined guide 31 to spirally wind the tape 4 on the rotary drum 5 over a predetermined angle, as in the first embodiment. FIG. 26 shows a condition in which the loading operation is completed by the above operations, and information can be written on or read from the tape 4 by the use of a read/write head.

Although FIG. 26 shows the construction similar to the construction of the first embodiment, it may be of a construction similar to the constructions of the second to fourth embodiments.

In all of the above embodiments, although the tape 4 is wound on the rotary drum 5 from the take-up tape reel side, the invention can also be applied to the type of construction in which the lead angle for winding the tape 4 on the rotary drum 5 is reverse, and the tape 4 is wound on the rotary drum from the supply tape reel side, in which case the arrangement of the parts is symmetrically reversed in a right-left direction.

Figure 27:
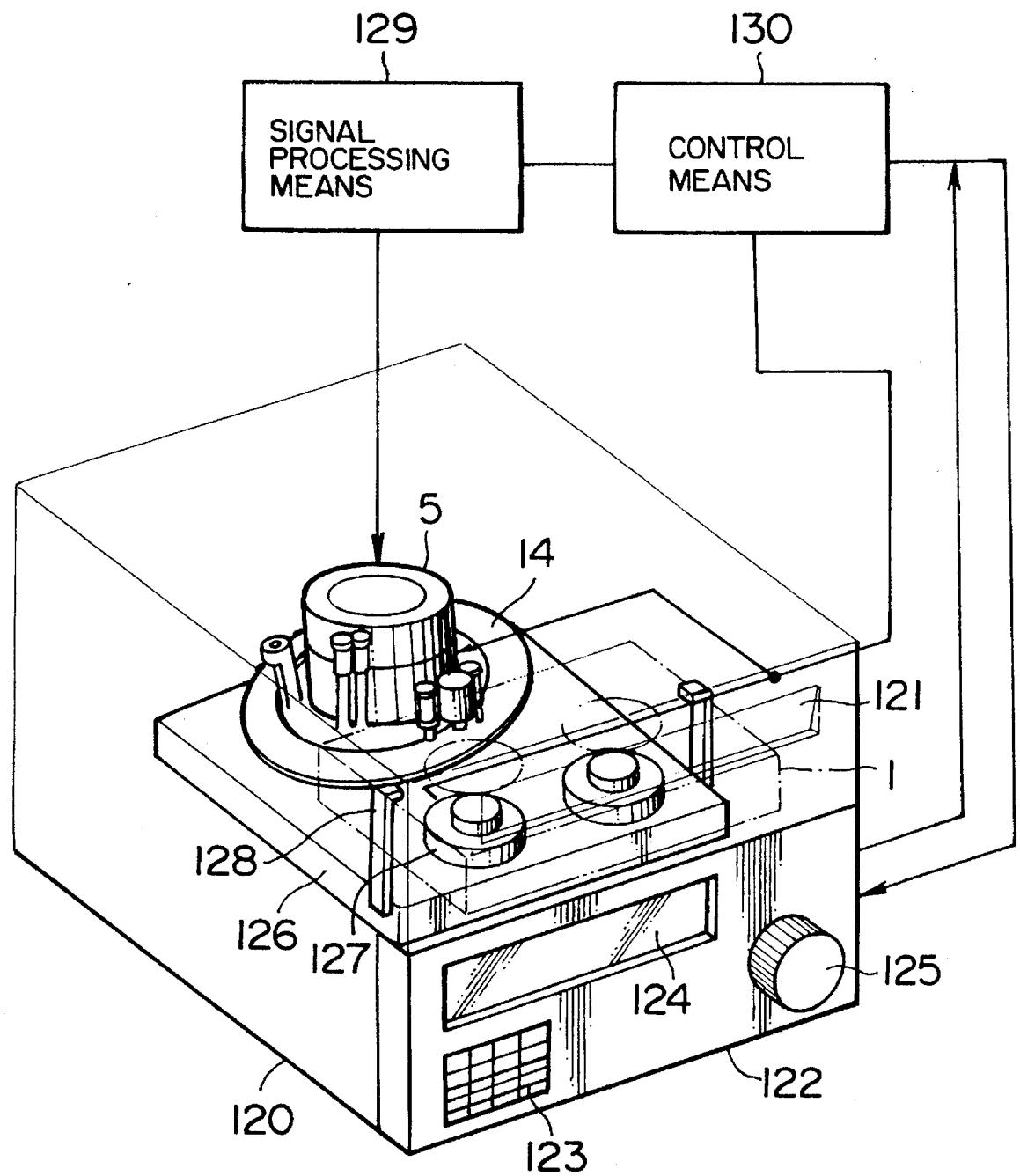
FIG. 27 is a perspective view of a recording/reproducing apparatus incorporating the present invention.

FIG. 27 is a perspective view of one preferred embodiment of a recording/reproducing apparatus incorporating a tape loading system of the present invention. In FIG. 27, this recording/reproducing apparatus includes an outer cover 120, a tape cassette insertion/discharge slot 121 for a tape cassette 1, and a control panel 122 on which operation means 123 and 125 and a display means 124 are provided. The tape loading device of the invention, including a rotary drum 5 and a loading ring 14 and so on, is mounted on a chassis 126. This apparatus further comprises a tape reel drive means 127 for driving reels in the tape cassette 1, a tape cassette fixing means 128 for fixing the tape cassette 1, inserted from the tape cassette insertion/discharge slot 121, in a predetermined position, and a signal processing means 129 by which a read/write head, provided in the rotary drum 5, reads and write signals. A control means 130 receives operation information from the operation means 123 and 125 or directly from the exterior of the recording/reproducing apparatus of the invention, and feeds display information to the display means 124, and also controls and drives the rotary drum 5, the tape reel drive means 127, the loading ring 14 and so on through the signal processing means 129.

When the tape cassette 1 is inserted into the tape cassette insertion/discharge slot 121, the tape cassette 1 is fixed in the predetermined position by the tape cassette fixing means 128, and the tape reels (not shown) in the tape cassette 1 are connected to the tape reel drive means 127. Then, in response to a control signal from the control means 130, the loading ring 14 rotates to effect a loading operation in which the tape is taken out from the tape cassette 1, and is wound on the rotary drum 5. Then, the rotary drum 5, the read/write head in the rotary drum 5, the tape reel drive means 127, and the capstan shaft 22 shown in FIGS. 1 and 2 are driven through the signal processing means 129, so that information is written on or read from the tape-like recording medium (tape). When an instruction for removing the tape cassette 1 is inputted from the operation means 123 or 125, the control means 130 is responsive to this operation information to stop the recording or the reproducing operation and to effect an unloading operation. In this unloading operation, the loading ring 14 is rotated in a direction reverse to the direction for the tape loading operation, and the tape reel drive means 127 is driven to take up the tape 4 on the tape reel, thus receiving the tape in the tape cassette 1. Then, the tape cassette 1 is removed from the insertion/discharge slot 121. With the above sequential operation, information can be written on or read from the tape in the tape cassette 1. The operation information does not always need to be inputted into the control means 130 from the operation means 123 or 125, and such operation information may be inputted into the control means 130 directly from the exterior of the recording/reproducing apparatus of the invention.

In this embodiment, although the recording/reproducing apparatus, using the tape cassette 1 containing the supply tape reel 2 and the take-up tape reel 3, has been described, the invention can also be applied to the type of recording/reproducing apparatus using the tape cartridge 80 containing only the supply tape reel 81, as described above for the tape loading device of FIG. 26.

As described above in detail, during the tape loading or the tape unloading operation, by winding the tape around the auxiliary inclined guide (which is in contact with that portion of the tape extending between the rotary drum and the leading tape guide on the loading ring) at a suitable angle, tape damage due to twisting of the tape developing during the loading or the unloading operation can be prevented.

When the loading ring begins to take out the tape, the direction of angular movement of the auxiliary inclined guide relative to the leading tape guide is made appropriate, so that the auxiliary inclined guide can contact the tape, disposed in the plane of the tape reels, before the leading tape guide. In this case, the inclination of the auxiliary inclined guide is smaller than that of the leading tape guide, and it can contact the tape generally perpendicularly. Furthermore, the auxiliary inclined guide is not provided with any flange, and can contact the tape generally uniformly, and therefore damage to the tape, developing when the tape begins to be taken out, can be prevented.

As a result, there can be provided the recording/reproducing apparatus which is free from a tape damage throughout the loading operation even if the thin tape is used, thus achieving high reliability.

What is claimed is:

1. A tape loading device for loading a tape into a magnetic conversion apparatus, said tape loading device comprising:

fixing means for fixing a tape reel, having a recording tape wound thereon, in a fixed position within the magnetic conversion apparatus;

a rotary drum for spirally winding the recording tape on an outer periphery thereof over a predetermined angle, said rotary drum having at least one magnetic head mounted thereon;

a plurality of tape guides supported for movement in a plane inclined relative to the tape reel; and moving means for moving said plurality of tape guides around said rotary drum along a predetermined path on said inclined plane to effect a loading operation by moving said plurality of tape guides along said predetermined path with a leading one of said plurality of tape guides taking out the recording tape from the tape reel to spirally wind the recording tape on said rotary drum over the predetermined angle, and an unloading operation by moving said plurality of tape guides along said predetermined path in a direction reverse to the direction of movement of said plurality of tape guides during the loading operation; and an auxiliary guide inclined relative to said leading one of said plurality of tape guides to bring said auxiliary guide in contact with a portion of the recording tape extending between said rotary drum and said leading one of said plurality of tape guides during the loading or the unloading operation.

2. A tape loading device according to claim 1, wherein said auxiliary guide is inclined in such a direction that said portion of the recording tape is kept in a flat plane.

3. A tape loading device according to claim 1, wherein said auxiliary guide is inclined in a direction different from that which would result in said portion of the recording tape being kept in a flat plane.

4. A tape loading device according to claim 1, wherein said moving means includes a support member angularly movable around said rotary drum, said leading one of said tape guides is mounted in a generally upstanding manner on said support member, and, said auxiliary guide is mounted for angular movement in proximity to said leading one of said plurality of tape guides.

5. A tape loading device according to claim 4, wherein said support member has a guide groove therein which changes direction along a path of movement of said leading one of said plurality of tape guides, said auxiliary guide is responsive to angular movement of said support member for angular movement of said auxiliary guide about said leading one of said plurality of tape guides in accordance with said guide groove, and said leading one of said tape guides is supported on said support member in a direction generally perpendicular to the longitudinal direction of said movement path between said leading tape guide and said auxiliary guide.

6. A tape loading device according to claim 4, wherein said support member includes a first gear; a second gear in mesh with said first gear for rotation about an axis thereof; a drive link rotatable in unison with said second gear; a link pin mounted on a portion of said drive link remote from the axis of rotation of said drive link; and a guide plate having therein a guide groove extending along the path of movement of said leading one of said plurality of tape guides; and wherein said link pin is received in said guide groove so that during movement of said leading one of said plurality of tape guides, said auxiliary guide is angularly moved about said leading one of said plurality of tape guides in accordance with said guide groove.

7. A tape loading device according to claim 4, wherein said support member includes a rotatable drive link; a first link pin mounted on a portion of said drive link remote from the axis of rotation of said drive link; a second link pin mounted on a portion of said drive link remote from the axis of rotation of said drive link and at a position different from the position of said first link pin; and a guide plate having therein first and second guide grooves extending along a path of movement of said leading one of said plurality of tape guides; and wherein said first and second link pins are received respectively in said first and second guide grooves such that said auxiliary guide is angularly moved in accordance with movement of said first and second link pins respectively along said first and second guide grooves during the movement of said leading tape guide.

8. A tape loading device according to claim 1, wherein said moving means includes a holder member mounting said auxiliary guide in a generally upstanding manner, said holder member being responsive to movement of said leading one of said plurality of tape guides for angular movement of said holder member about an axis of said one of said plurality of tape guides.

9. A tape loading device according to claim 8, wherein said holder member includes a first gear; a second gear in mesh with said first gear for rotation about an axis thereof; a drive link rotatable in unison with said second gear; a link pin mounted on a portion of said drive link remote from the axis of rotation of said drive link; and a guide plate having therein a guide groove extending along the path of movement of said leading one of said plurality of tape guides; and wherein said link pin is received in said guide groove so that during movement of said leading one of said plurality of tape guides, said auxiliary guide is angularly moved about said leading one of said plurality of tape guides in accordance with said guide groove.

10. A tape loading device according to claim 8, wherein said holder member includes a rotatable drive link; a first link pin mounted on a portion of said drive link remote from the axis of rotation of said drive link; a second link pin mounted on a portion of said drive link remote from the axis of rotation of said drive link and at a position different from the position of said first link pin; and a guide plate having therein first and second guide grooves extending along a path of movement of said leading one of said plurality of tape guides; and wherein said first and second link pins are received respectively in said first and second guide grooves such that said auxiliary guide is angularly moved in accordance with movement of said first and second link pins respectively along said first and second guide grooves during the movement of said leading tape guide.

11. A tape loading device according to claim 1, wherein when said leading one of said plurality of tape guides begins to take out the recording tape, said auxiliary guide contacts the recording tape before said leading one of said plurality of tape guides contacts the recording tape, and when said auxiliary guide contacts the recording tape, the angle of inclination of said auxiliary guide relative to the recording tape is smaller than the angle of inclination of said leading one of said plurality of tape guides relative to the recording tape.

12. A tape loading device according to claim 1, wherein said moving means includes means tiltably supporting said auxiliary guide in a second plane inclined relative to the inclined plane of movement and responsive to movement of said tape guides for varying the angle of inclination of said auxiliary guide.

13. A tape loading device according to claim 1, wherein said moving means supports said auxiliary guide for movement parallel to the inclined plane of movement and responsive to movement of said tape guides for movement of said auxiliary guide along the inclined plane.

14. A magnetic conversion apparatus comprising:
   tape cassette fixing means for fixing a tape cassette, containing a supply tape reel and a take-up tape reel with a recording tape wound around the supply and take-up reels in a fixed position within the magnetic conversion apparatus;
   tape reel drive means for driving the tape reels;
   a rotary drum having a magnetic converter mounted thereon for writing and read information on and from the recording tape spirally wound when the recording tape is on an outer periphery of said rotary drum over a predetermined angle;
   signal processing means for processing signals to enable said magnetic converter to magnetically convert the information;
   control means responsive to signals from said signal processing means for controlling said magnetic converter and said tape reel drive means m to effect magnetic conversion of the information; and
   a tape loading device for loading the recording tape on said rotary drum, wherein said tape loading device comprises:
     a plurality of tape guides supported for movement in a plane inclined relative to the tape reel; and
     moving means for moving said plurality of tape guides around said rotary drum along a predetermined path on said inclined plane to effect a loading operation, by moving said plurality of tape guides along said predetermined path with a leading one of said plurality of tape guides taking out the recording tape from the tape reel to spirally wind the recording tape on said rotary drum over the predetermined angle, and an unloading operation, by moving said plurality of tape guides along said predetermined path in a direction reverse to the direction of movement of said plurality of tape guides during the loading operation; and an auxiliary guide inclined relative to said leading one of said plurality of tape guides to bring said auxiliary guide in contact with a portion of the recording tape extending between said rotary drum and said leading one of said plurality of tape guides during the loading or the unloading operation.

15. A magnetic conversion apparatus according to claim 14, wherein said magnetic converter comprises a read/write head for reading and writing information in the form of magnetic signals.

16. A magnetic conversion apparatus according to claim 14, wherein said magnetic converter comprises a write head for writing information in the form of magnetic signals.

17. A magnetic conversion apparatus according to claim 14, wherein said magnetic converter comprises a read head for reading information in the form of magnetic signals.

18. A magnetic conversion apparatus comprising:

tape cartridge fixing means for fixing a tape cartridge containing a supply tape reel having a recording tape wound thereon;

a take-up tape reel for winding the recording tape thereon;

tape reel drive means for driving the supply tape reel and said take-up tape reel;

a threading mechanism for moving a tape take-out member, fixedly secured to one end of the recording take from the supply tape reel to said take-up tape reel;

a rotary drum, having a magnetic converter mounted thereon for magnetically converting information relative to the recording tape when the recording tape is spirally wound on an outer periphery of said rotary drum over a predetermined angle;

signal processing means for processing signals to enable said magnetic converter to write and read the information;

control means responsive to signals from said signal processing means for controlling said magnetic converter and said tape reel drive means to effect magnetic conversion of the information; and a tape loading device for loading the recording tape on said rotary drum, when the tape take-out member has been moved to said take-up tape reel, wherein said tape loading device comprises:

a plurality of tape guides supported for movement in a plane inclined relative to the tape reel; and moving means for moving said plurality of tape guides around said rotary drum along a predetermined path on said inclined plane to effect a loading operation, by moving said plurality of tape guides along said predetermined path with a leading one of said plurality of tape guides taking out the recording tape from the tape reel to spirally wind the recording tape on said rotary drum over the predetermined angle, and an unloading operation, by moving said plurality of tape guides along said predetermined path in a direction reverse to the direction of movement of said plurality of tape guides during the loading operation; and an auxiliary guide inclined relative to said leading one of said plurality of tape guides to bring said auxiliary guide in contact with a portion of the recording tape extending between said rotary drum and said leading one of said plurality of tape guides during the loading or the unloading operation.

19. A magnetic conversion apparatus according to claim 18, wherein said magnetic converter comprises a read/write head for reading and writing information in the form of magnetic signals.

20. A magnetic conversion apparatus according to claim 18, wherein said magnetic converter comprises a write head for writing magnetic information in the form of magnetic signals.

21. A magnetic conversion apparatus according to claim 18, wherein said magnetic converter comprises a read head for reading magnetic information in the form of magnetic signals.

22. A tape loading device for loading a tape into a rotary head type magnetic conversion apparatus having therein a rotary drum with at least one magnetic head mounted thereon, said tape loading device comprising:

fixing means for fixing a tape reel, having a recording tape wound thereon, within the magnetic conversion apparatus in a fixed position relative to the rotary drum;

a support member supported for movement in a plane inclined relative to the tape reel;

a plurality of tape guides supported in said support member for movement therewith;

an auxiliary guide mounted in said support member for pivotal movement about a leading one of said plurality of tape guides, said auxiliary guide being inclined relative to said leading one of said plurality of tape guides;

moving means for moving said support member to move said plurality of tape guides and said auxiliary guide around the rotary drum along a predetermined path on said inclined plane to effect a loading operation, in which said auxiliary guide takes out the recording tape from the tape reel, spirally winds the recording tape on an outer periphery of the rotary drum over a predetermined angle, with said auxiliary guide in contact with a portion of the recording tape extending between the rotary drum and said leading one of said plurality of tape guides, and releases the recording tape with the recording tape retained spirally wound on the outer periphery of the rotary drum by said plurality of tape guides and an unloading operating, in which said plurality of tape guides and said auxiliary guide are moved along the predetermined path in a direction reverse to the direction of movement of said plurality of tape guides and said auxiliary guide during the loading operation.

* * * * *